United States Patent
Kalinowski et al.

(10) Patent No.: US 12,413,860 B2
(45) Date of Patent: *Sep. 9, 2025

(54) COUNTER-BALANCING VIBRATIONS FROM A VEHICLE FOR STABILIZING IMAGE CAPTURE

(71) Applicant: Skydio, Inc., San Mateo, CA (US)

(72) Inventors: David Kalinowski, Redwood City, CA (US); Stephen R. McClure, Belmont, CA (US); Patrick Allen Lowe, Palo Alto, CA (US); Daniel Thomas Adams, Palo Alto, CA (US); Benjamin Scott Thompson, San Carlos, CA (US); Adam Parker Bry, Redwood City, CA (US); Abraham Galton Bachrach, Emerald Hills, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,327

(22) Filed: Oct. 5, 2023

(65) Prior Publication Data
US 2024/0251165 A1    Jul. 25, 2024

Related U.S. Application Data

(63) Continuation of application No. 17/240,402, filed on Apr. 26, 2021, now Pat. No. 11,818,463, which is a continuation of application No. 16/579,624, filed on Sep. 23, 2019, now Pat. No. 10,992,865, which is a
(Continued)

(51) Int. Cl.
    *H04N 23/68*        (2023.01)

(52) U.S. Cl.
CPC ....... *H04N 23/683* (2023.01); *H04N 23/6811* (2023.01)

(58) Field of Classification Search
CPC .......... H04N 5/23254; H04N 5/23258; H04N 5/23267; H04N 5/2328
See application file for complete search history.

(56) References Cited

U.S. PATENT DOCUMENTS

| | | | |
|---|---|---|---|
| 9,321,531 B1 | 4/2016 | Takayama et al. | |
| 9,434,481 B2 * | 9/2016 | McGeer | B64F 1/04 |
| 9,557,738 B2 * | 1/2017 | Enke | G01C 23/00 |

(Continued)

*Primary Examiner* — Amy R Hsu

(57) ABSTRACT

Embodiments are described for a stabilization system configured, in some embodiments, for stabilizing image capture from an aerial vehicle (e.g., a UAV). According to some embodiments, the stabilization systems employs both active and passive stabilization means. A passive stabilization assembly includes a counter-balanced suspension system that includes an elongated arm that extends into and is coupled to the body of a vehicle. The counter-balanced suspension system passively stabilizes a mounted device such as an image capture device to counter motion of the UAV while in use. In some embodiment the counter-balanced suspension system passively stabilizes a mounted image capture assembly that includes active stabilization means (e.g., a motorized gimbal and/or electronic image stabilization). In some embodiments, the active and passive stabilization means operate together to effectively stabilize a mounted image capture device to counter a wide range of motion characteristics.

20 Claims, 32 Drawing Sheets

Related U.S. Application Data continuation of application No. 15/790,776, filed on Oct. 23, 2017, now Pat. No. 10,455,155.

(60) Provisional application No. 62/412,770, filed on Oct. 25, 2016.

(56) References Cited

U.S. PATENT DOCUMENTS

| | | | |
|---|---|---|---|
| 9,561,852 B1* | 2/2017 | Beaman | B64C 37/02 |
| 9,676,481 B1* | 6/2017 | Buchmueller | G05D 1/0094 |
| 9,753,461 B1* | 9/2017 | Johnson | G05D 1/0011 |
| 9,828,097 B1 | 11/2017 | Mishra et al. | |
| 2005/0280707 A1 | 12/2005 | Sablak et al. | |
| 2006/0203098 A1 | 9/2006 | Henninger et al. | |
| 2011/0290937 A1* | 12/2011 | Salkeld | G05D 1/0094 |
| | | | 348/E7.085 |
| 2016/0076892 A1 | 3/2016 | Zhou et al. | |
| 2016/0198088 A1* | 7/2016 | Wang | B64U 20/87 |
| | | | 348/36 |
| 2016/0340006 A1 | 11/2016 | Tang | |
| 2016/0352992 A1* | 12/2016 | Saika | H04N 23/685 |
| 2017/0048439 A1* | 2/2017 | von Borcke-Morawitz | |
| | | | H02N 2/108 |
| 2017/0291704 A1 | 10/2017 | Alegria | |

* cited by examiner

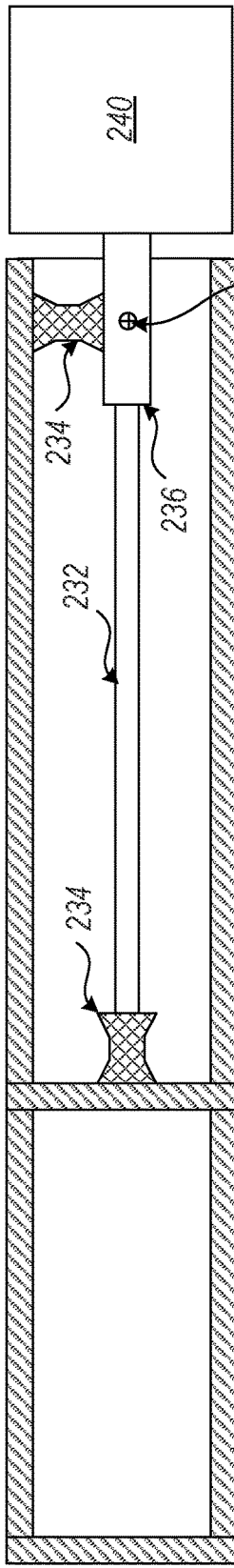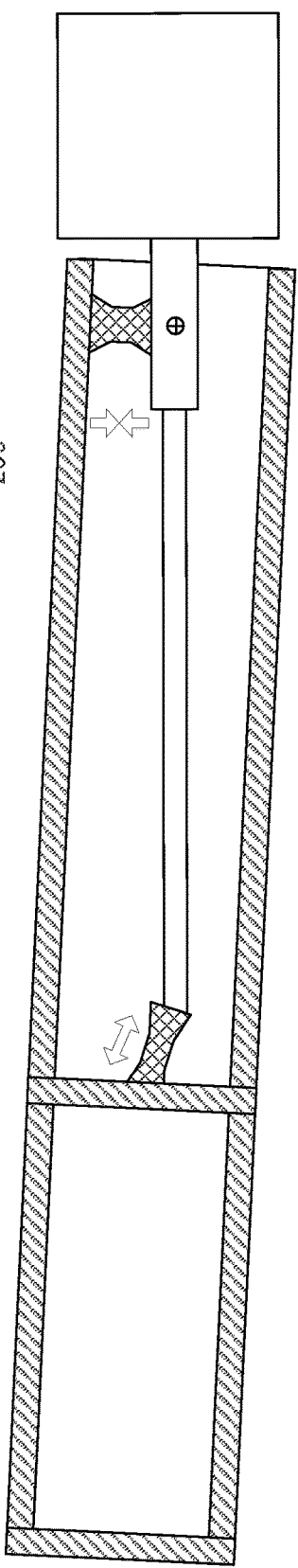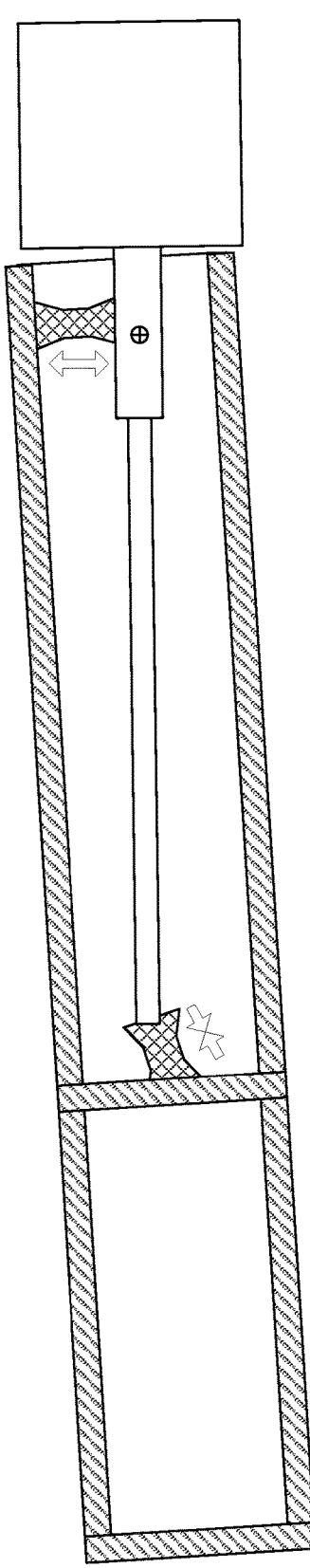

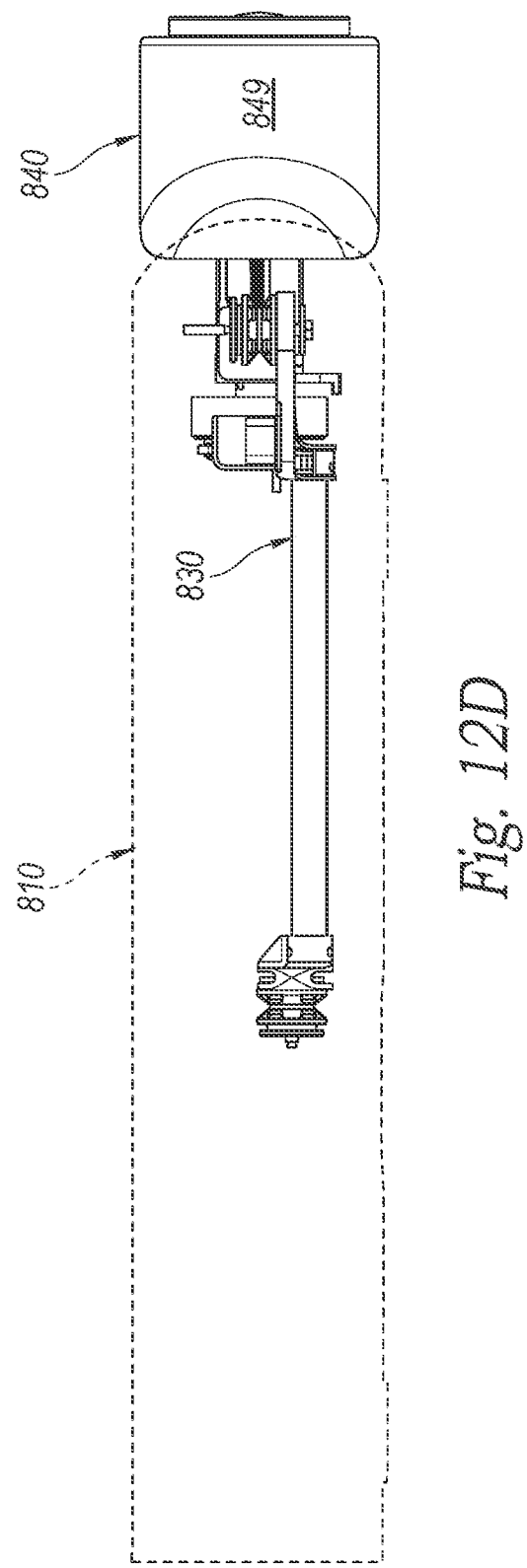

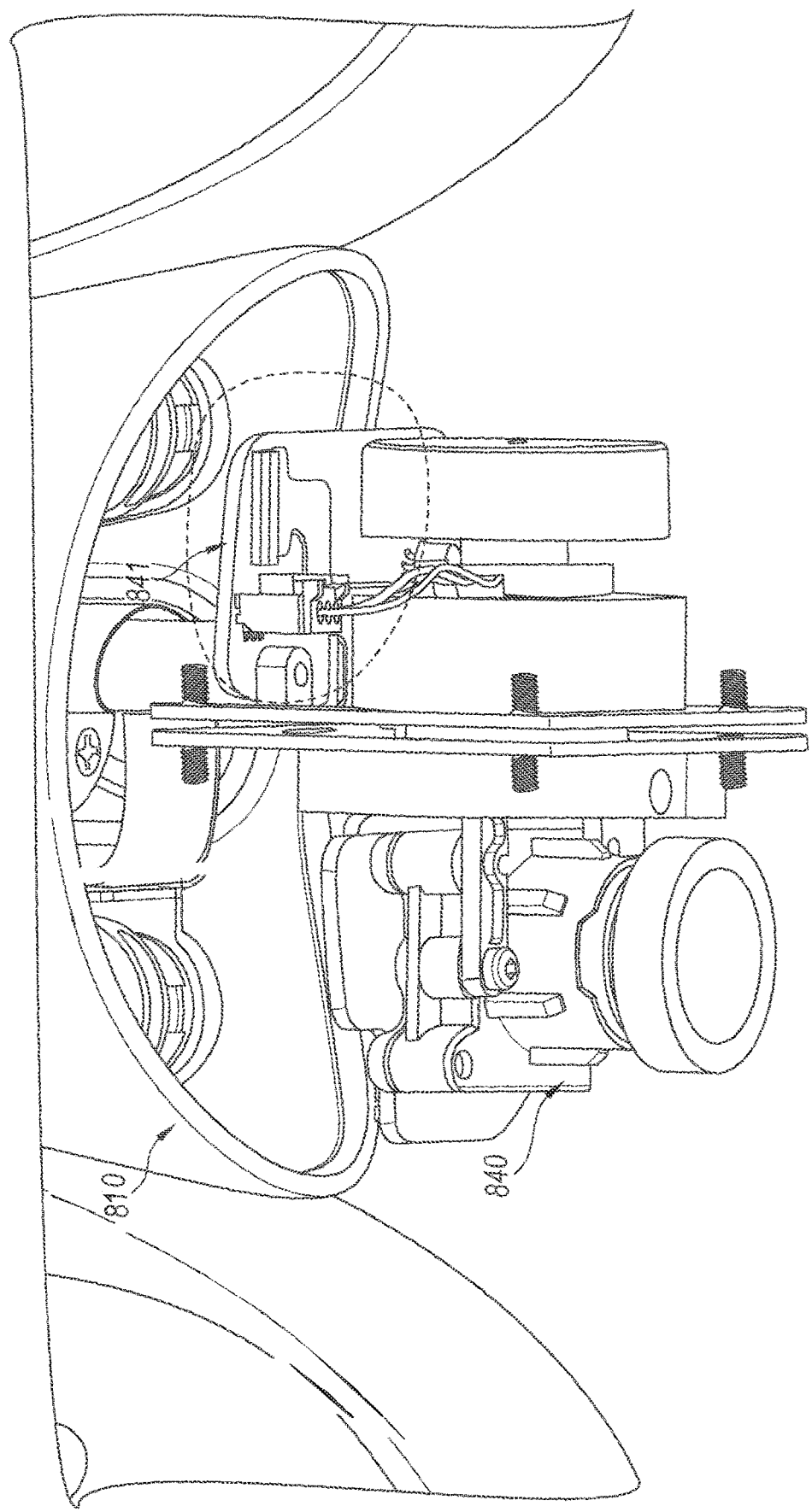

COUNTER-BALANCING VIBRATIONS FROM A VEHICLE FOR STABILIZING IMAGE CAPTURE

CROSS-REFERENCE TO RELATED APPLICATION(S)

This application is a continuation of U.S. patent application Ser. No. 17/240,402, entitled "COUNTER-BALANCING VIBRATIONS FROM A VEHICLE FOR STABILIZING IMAGE CAPTURE," filed Apr. 26, 2021; which is a continuation of U.S. patent application Ser. No. 16/579,624, entitled "COUNTER-BALANCED SUSPENDED IMAGE STABILIZATION SYSTEM," filed Sep. 23, 2019, and issued as U.S. Pat. No. 10,992,865 on Apr. 27, 2021; which is a continuation application of U.S. patent application Ser. No. 15/790,776, entitled "COUNTER-BALANCED SUSPENDED IMAGE STABILIZATION SYSTEM," filed Oct. 23, 2017, and issued as U.S. Pat. No. 10,455,155 on Oct. 22, 2019; which is entitled to the benefit of and/or the right of priority to U.S. Provisional Patent Application No. 62/412,770, entitled "COUNTER-BALANCED SUSPENDED IMAGE STABILIZATION SYSTEM," filed Oct. 25, 2016, each of which is hereby incorporated by reference in its entirety for all purposes. This application is therefore entitled to a priority date of Oct. 25, 2016.

TECHNICAL FIELD

The present disclosure generally relates passive and active image stabilization systems. Specifically, the present disclosure relates to system configured to stabilize image capture from an aerial vehicle such as UAV across a wide range of motion characteristics.

BACKGROUND

Unmanned Aerial Vehicles (UAVs) generally include any aircraft capable of controlled flight without a human pilot onboard. UAVs may be controlled autonomously by onboard computer processors and/or by a remotely located human pilot. Like pilot-driven helicopters, some UAVs can be configured as rotor-based aircraft. For example, several manufacturers offer commercially available UAVs that include four rotors, otherwise known as "quadcopters." Often UAVs are fitted with image capture devices such as cameras that can be configured both to capture images (including video) of the surrounding environment and increasingly to facilitate autonomous visual navigation. Often the motion of a UAV in flight can negatively impact the quality of image capture. Accordingly, systems can be employed to counter such motion through active and passive means.

BRIEF DESCRIPTION OF THE DRAWINGS

The present embodiments are illustrated by way of example and are not intended to be limited by the figures of the accompanying drawings.

FIGS. 4A-4C show a series of cross sections of the example UAV depicted in FIG. 2 that further illustrate passive stabilization of an image capture assembly by a counter-balanced suspension system.

FIG. 12D shows a side view of the image capture assembly depicted in FIG. 11A, with a housing cover, and in the context of the housing of the UAV depicted in FIG. 8A.

FIG. 13 shows a detail of the image capture assembly of FIG. 11A.

DETAILED DESCRIPTION

Specific embodiments of the invention are described herein for purposes of illustration. Various modifications may be made without deviating from the scope of the invention. Accordingly, the invention is not limited except as by the appended claims.

Overview

Aerial vehicles, such as UAVs can be fitted with image capture devices (e.g., one or more cameras) to capture images (including video) of a surrounding physical environment while the vehicle is in flight. Various image stabilization techniques can be implemented in an attempt to counter the motion of a vehicle while in flight in an attempt to improve the quality of image capture. For example, many currently available image capture devices include sensors (e.g., accelerometers and/or gyroscopes) configured to detect motion such as changes in position and/or orientation. Using this motion information, a number of techniques may be employed to actively stabilize image capture to counter the detected motion. For example, in some cases image capture devices may include integrated mechanical systems configured to actuate certain optical elements (e.g., optical sensors and/or the lens) to counter the detected motion of the image capture device. In the case of digital image capture devices, software may alternatively or additionally be employed to transform the captured digital images to counter the motion of the image capture device. Such techniques are generally referred to as electronic image stabilization (EIS).

While image stabilization systems internal to the image capture device can counter relatively small changes in position/orientation they have limited effectiveness countering more drastic changes in position/orientation, for example those experienced by a vehicle in flight. To counter such motion, a system can be employed to stabilize the body of the image capture device relative to the body of the vehicle. This can be achieved, for example by mounting the image capture device body to a mechanical gimbal system configured to rotate the image capture device about one or more axes relative to the body of an aerial vehicle.

Figure 1A:
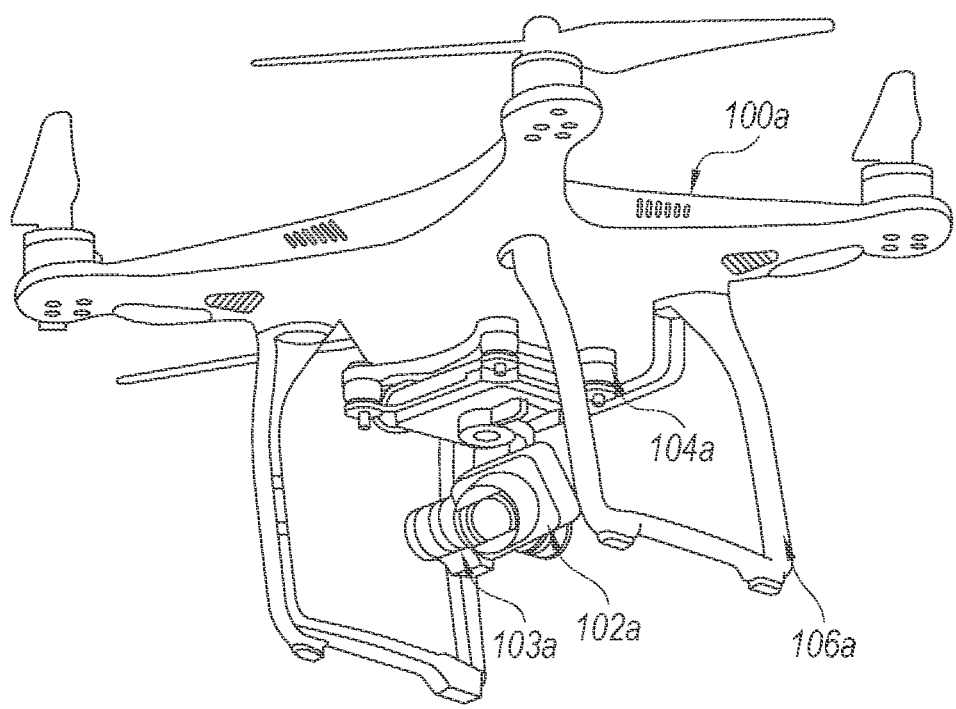
FIG. 1A shows an example UAV that includes an image capture device suspended below the body of the UAV.

FIG. 1A shows a first example configuration of a UAV 100a that includes an image capture device 102a suspended below the body of the UAV 100a. In this example configuration, the image capture device 102 may be mounted to a bottom side of the body of UAV 100a via a multi-axis mechanical gimbal 103a configured to rotate the image capture device 102a about multiple axes to counter a motion of the UAV 100a while in flight. To counter higher frequency translations (e.g., vibrations caused by the propulsion systems onboard the UAV), such a configuration may also include passive motion isolators 104a between the body of the UAV 100a and the mechanical gimbal system 103a supporting the image capture device 102a. While the system described in FIG. 1A can be configured to effective stabilize image capture to some degree it significantly impacts the overall form factor of the vehicle (as is evident in the depiction in FIG. 1A). This may not be as a primary concern for aircraft that are much larger than the image capture device (e.g., a manned aircraft), but does become more of a concern for relatively small vehicles such as a quadcopter UAV. Further, in such a configuration, the field of view of the image capture device 102a may become obscured at certain angles by elements of the body of the UAV 100a, for example the landing supports 106a shown in FIG. 1A.

Figure 1B:
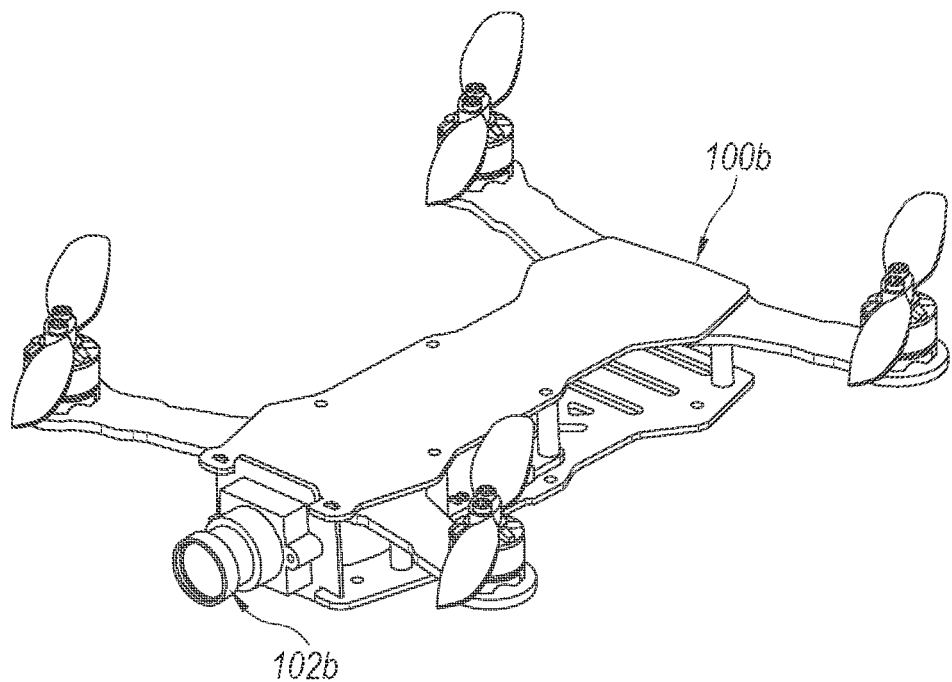
FIG. 1B shows an example UAV that includes an image capture device mounted to the front side of the body of the UAV via a cantilever mount.

To address the form factor issue, an image capture device can instead be mounted in a cantilevered configuration relative to the body of the vehicle. For example, FIG. 1B shows an image capture device 102b coupled to the front side of the body of UAV 100b via a cantilever mount. Although not depicted in FIG. 1B, such a configuration may also include stabilization systems such as the mechanical gimbal 103a and vibration isolators 104a shown in FIG. 1A. However, a cantilever mounted image capture device 102b does introduce challenges with respect to passive motion isolation. Any vibration isolators placed between the body of the UAV 100b and the cantilever mounted image capture device 102b should be stiff enough to handle the shear force caused by the weight of the image capture device 102b, but soft enough to dampen translational motion in the body of the UAV 100b along a range of frequencies. Vibrational isolators (e.g., shock absorbing mounts made of rubber or an elastomer material) alone will have limited effectiveness isolating the image capture device 102b against certain motion because the material characteristics need to isolate such motion will cause the image capture device 102b to sag under its own weight.

Introduced herein are novel techniques for stabilizing image capture from an aerial vehicle that address the issues discussed above. For example, embodiments are described that include a counter-balanced suspension assembly configured to passively isolate an image capture device from certain motion of the body of an aerial vehicle in flight. Specifically, according to some embodiments a counter-balanced suspension assembly may include an elongated arm that extends into an interior space of the body of the aerial vehicle and is dynamically mounted to the body via one or more isolators. The elongated arm in effect acts as a counter balance to the weight of the image capture device resulting in a dynamically balanced suspension system for the image capture device that has minimal impact on the overall factor of the vehicle. Further, in some embodiments, the counter-balanced suspension assembly can be combined with one or more active stabilization techniques (e.g., mechanical gimbals and/or EIS) to further improve image stabilization capability to counter a range of motion profiles.

Note that embodiments are described herein in the context of a UAV, specifically a UAV configured as quadcopter, to provide clear illustrative examples, however the described techniques are not limited to such applications. A person having ordinary skill will appreciate that the described techniques can be similarly applied to any platforms in motion. For example, similar image stabilization systems as introduced herein may be applied to other types of manned and unmanned aerial vehicles (e.g., fixed-wing jet aircraft, fixed-wing propeller aircraft, rotorcraft, airship, etc.), land vehicles (automobiles, motorcycles, bicycles, rail vehicles, etc.), and water vehicles (ships, boats, hovercraft, etc.). Further, embodiments are described herein in the context of stabilizing a mounted image capture device or image capture assembly, however the described techniques are not limited to such applications. The techniques for passive and active stabilization described herein can in many cases be easily applied to stabilizing any other type of device or object. For example, the described techniques may be implemented to stabilize a mounted payload container, sensor device, communications system, weapons system, illumination system, propulsion system, industrial tool (e.g., a robotic arm), etc.

Figure 2:
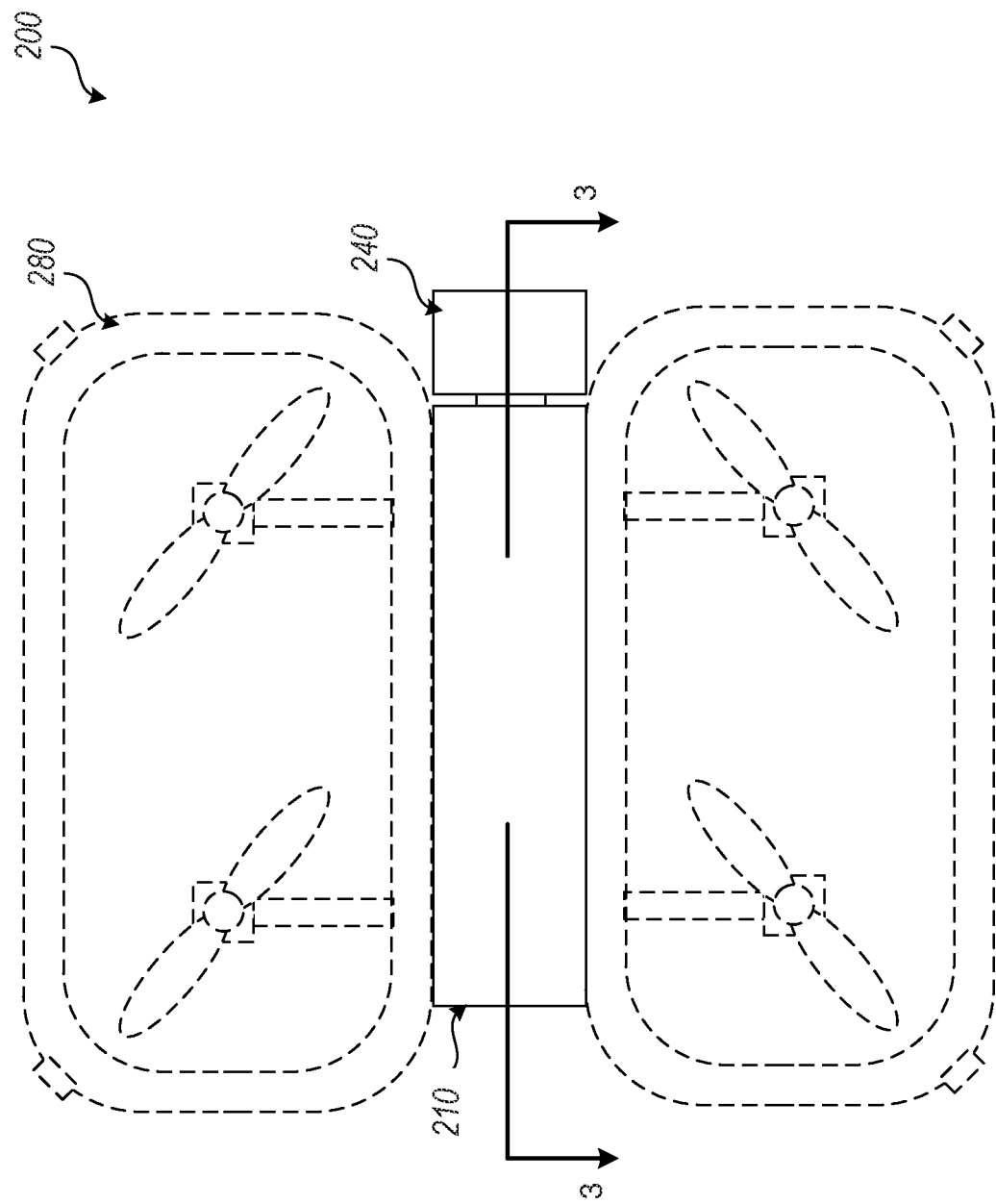
FIG. 2 shows a top view of an example UAV that incorporates one or more of the novel stabilization techniques described herein.

FIG. 2 shows a top view of an example UAV 200 that may include one or more of the image stabilization techniques described herein. As shown in FIG. 2, example UAV 200 includes a body housing 210 and a stabilized object 240 extending from one side (e.g., the front side of UAV 200). For clarity the stabilized object 240 will be described herein in the context of an "image capture assembly," however as previously mentioned, this stabilized object can be any type of object. Also shown in FIG. 2 are rotor assemblies 280 mounted on opposing sides of the body housing 210. Each rotor assembly may include one or more rotors and in some cases a perimeter structure substantially extending around the rotor blades. A perimeter structure can protect the one or more rotors from contact with objects in the physical environment, while UAV 200 is in flight and in some embodiments may house sensors (e.g., optical sensors) used for autonomous navigation. The concept of a perimeter structure is described in more detail in U.S. application Ser. No. 15/164,679, entitled, "PERIMETER STRUCTURE FOR UNMANNED AERIAL VEHICLE," filed May 25, 2016, the contents of which are hereby incorporated by reference in their entirety. Note, rotor assemblies 280 are illustrated in FIG. 2 to provide structural context for example UAV 200, but as indicated by their rendering in dotted line are otherwise not essential to the image stabilization techniques described herein.

The body housing 210 of example UAV 200 is shown in FIG. 2 as rectangular when viewed from above suggesting a cuboid structure, however it shall be understood that housing 210 may have any shape and be of any dimension. In general, housing 210 may include walls that enclose an interior body space (not shown in FIG. 2). For example, the area of housing 210 that is viewable in FIG. 2 may be a top wall.

Figure 3:
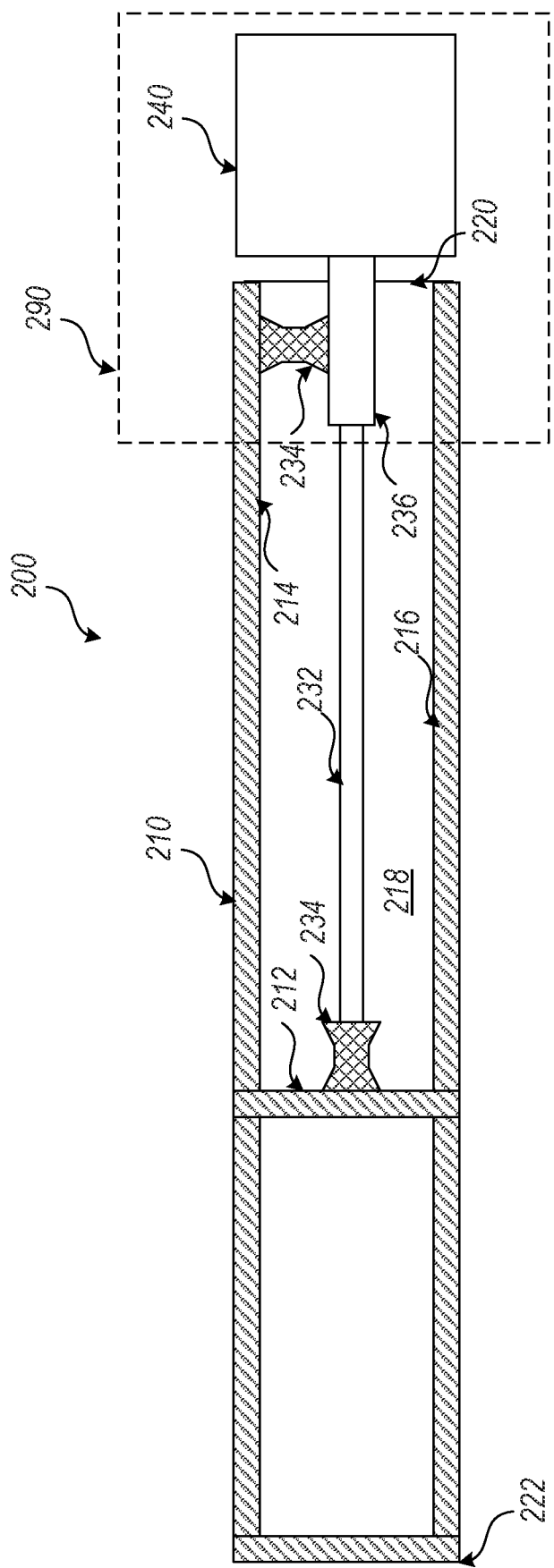
FIG. 3 shows a cross section of the example UAV depicted in FIG. 2.
Figure 5:
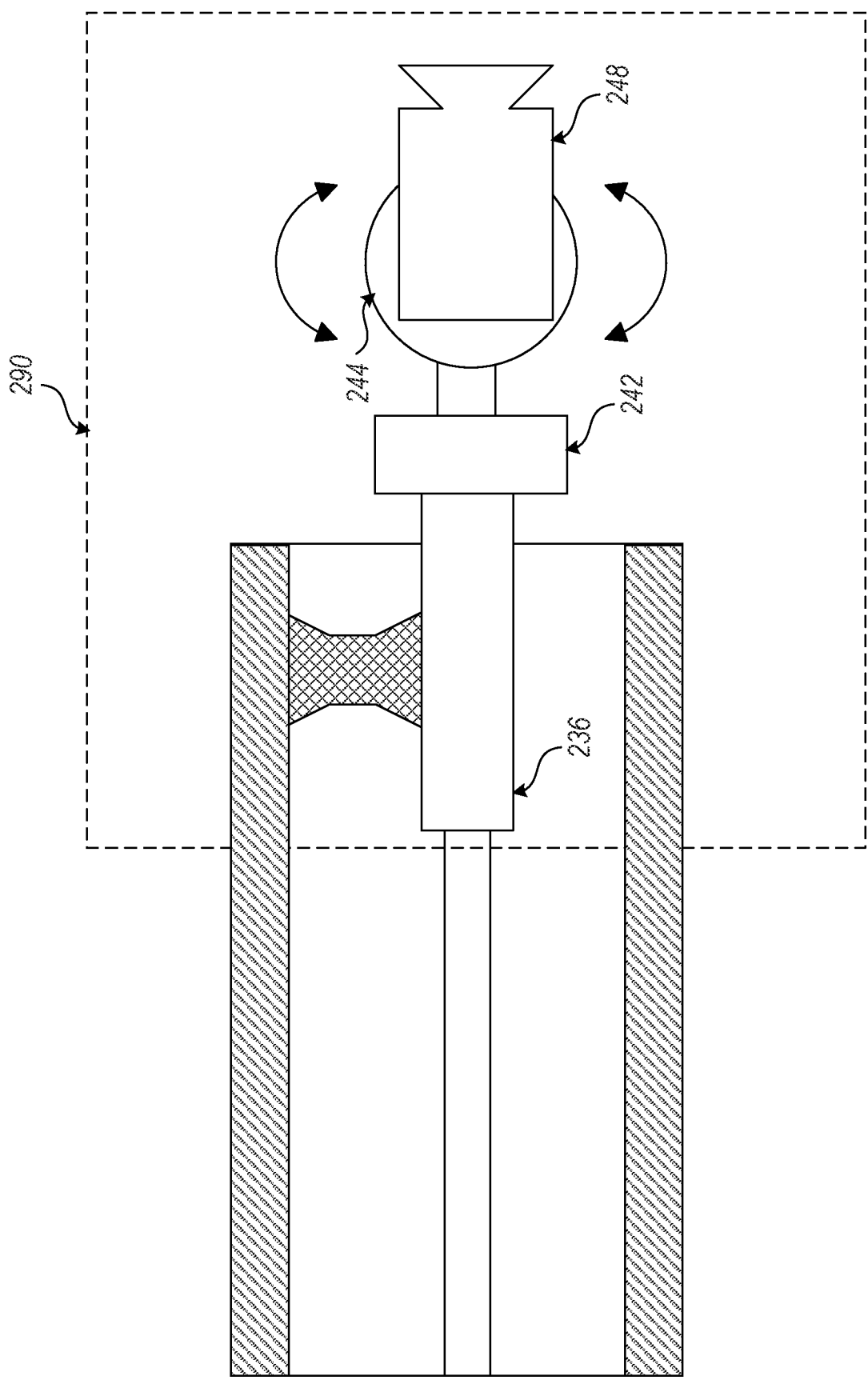
FIG. 5 shows a detail of the cross section of the UAV depicted in FIG. 2 that illustrates components of an example image capture assembly.

FIG. 3 shows a cross section of the example UAV 200 depicted in FIG. 2. The location of the view in FIG. 3 is indicated in FIG. 2 by view arrows marked with the number "3." A detail of the cross section shown in FIG. 3 is depicted in FIG. 5 as indicated by the dotted line box 290. As mentioned with respect to FIG. 2 and as shown in more detail in the cross section of FIG. 3, housing 210 may include one or more walls surrounding an interior space 218 of the housing 210. The interior space 218 has an opening 220 at the "front end" of the housing 210 through which the image capture assembly 240 protrudes and is defined by the interior surfaces of one or more of the walls of the housing 210. For example, as shown in FIG. 3, the interior space 218 is defined by an interior top surface 214, an interior bottom surface 216 opposite the interior top surface 214, and an interior back surface 212 opposite the opening 220 and located towards the "back end" 222 of the housing 210.

As further shown in FIG. 3, image capture assembly 240 is structurally coupled to a passive stabilization assembly that includes an elongated arm 232, a mounting assembly 236, and one or more isolators 234. An image capture assembly 240 may include one or more components related to image capture systems including, but not limited to an image capture device (e.g., a camera) and one or more active stabilization systems (e.g., mechanical gimbals and/or EIS systems) configured to actively stabilize image capture by the image capture device. In the depicted embodiment, the elongated arm 232 has a proximal end and a distal end and is arranged within the interior space 218 to extend from the interior back surface 212 towards the opening 220 at the front end of the housing 210. The distal end of the elongated arm is dynamically coupled to the interior back surface 212 via one or more isolators 234 and the proximal end is coupled to the mounting 234 assembly which is in turn mounted to one or more of the interior top surface 214 or interior bottom surface 216 (not depicted in FIG. 3) via one or more isolators 234. The image capture assembly 240 is structurally coupled to the mounting assembly 236 of the passive stabilization assembly. Accordingly, the passive stabilization assembly and image capture assembly form a structural unit dynamically coupled to the housing 210. Further, as is evident in FIG. 3 and as will be described in more detail with respect to FIGS. 4A-4C, elongated arm 232 forms a counter balance to the mass of the components in the image capture assembly 240. The image capture assembly 240 is thereby stabilized by a counter-balanced suspension system.

Note that the arrangement of elements comprising example UAV 200 are depicted in FIG. 3 in a simplified form to clearly illustrate the concept of passive stabilization of a mounted image capture assembly 240 through the use of a counter-balanced suspension system. For example, housing 210 is depicted in a simplified rectangular form, but depending on the specific implementation, housing 210 may have any shape of any dimension. Further, the walls forming the housing 210 are depicted in a simplified form and are not to be construed as limiting with regard to arrangement or dimension. For example, interior back surface 212 is depicted in FIG. 3 as being part of an interstitial wall arranged at appoint between the front and back end of the housing 210. A person having ordinary skill will recognize that this wall need not be present in all embodiments. For example, in some embodiments the elongated arm 232 may simply extend to a surface of a wall at the back end 222 of the housing 210. In other embodiments, the interior back surface 212 may be part of a support structure other than a wall within the housing 210 (e.g., a beam, a plate, a mounting bracket, etc.).

Further, the elements of the passive stabilization assembly are depicted in a simplified and illustrative purpose, and should not be construed as limiting with respect to arrangement or dimensions. For example, elongated arm 232 is depicted as uniform in dimension and extending a little over half way along the length of the housing 210. However, this is only an example embodiment. The actual implementation in any vehicle will depend greatly on the geometry of the vehicle housing 210, the characteristics of the image stabilization assembly 240, and the particular image stabilization requirements. As another example, mounting assembly 236 is depicted as a discrete component coupling the image capture assembly 240 to the elongate arm 232. However, in other embodiments, the passive stabilization assembly may include fewer or more components than as shown. For example, the elongated arm 232 may simply extend from the image capture assembly 240. Also, the passive stabilization assembly is shown in FIG. 3 as dynamically coupled to the housing 210 at two points (at least in the cross section view), however this is not to be construed as limiting. The passive stabilization assembly may be dynamically coupled to the housing at fewer or more points and at different locations than as shown while remaining within the scope of the currently described innovations. A person having ordinary skill will recognize that the coupling points will depend on the geometry of the housing 210 and the various components of the passive stabilization assembly and image capture assembly 240 for any given implementation.

FIGS. 4A-4C show a series of cross sections similar to the cross section depicted in FIG. 3 that further illustrate passive stabilization of an image capture assembly 240 by a counter-balanced suspension system. FIG. 4A, for example, shows a cross section of example UAV 200 in a resting state with the dynamic components (i.e., the passive stabilization assembly and image stabilization assembly 240) in mechanical equilibrium. For example, the dynamic components supported or suspended via isolators 234 may have a center of mass at point 260. Note that the location of the center of mass 260 in FIG. 4A is an example provided for illustrative purposes and is not to be construed as limiting. For example, the center of mass 260 need not be located at or about the mounting assembly 236 or near an isolator 234 as shown in FIG. 4A. The specific arrangement in any given embodiment will depend on the stabilization requirements, geometry of the system, the materials used, etc.

FIGS. 4B-4C show the passive stabilization of the image assembly 240 in response movement of example UAV 200. For example, FIGS. 4B-4C illustrate stabilization of image assembly 240 in response to the rotational and/or translational motion by example UAV 200. The examples shown in FIGS. 4B-4C are provided for illustrative purposes and do not necessarily show actual ranges of motion for the components of example UAV 200. For example, the depicted changes in position/orientation may be exaggerated for clarity.

As shown, the isolators 234 may in some embodiments act as spring dampers to isolate the dynamic components from certain rotational and/or translational motion by UAV 200. For example, in some embodiments each isolator 234 may act as a spring damper to isolate motion in all of the x, y, and z directions. As will be explained, in some embodiments each isolator 234 may exhibit, based on its geometry and material properties, a 1:1:1 ratio of compression stiffness to tensile stiffness to shear stiffness. In other words, each isolator 234 may act as a spring damper that responds uniformly in the x, y, and z directions.

Generally speaking, an increase in the length of the elongated arm 232 will tend to increase the moment of inertia of the dynamic components about a center of rotation (for example, but not necessarily the center of mass 260). This increase in the moment of inertia will tend to resist external torque applied through the motion of the housing, thereby providing a stabilizing effect. Accordingly, in some embodiments, elongated arm 232 extends all the way to or at least as close as possible to the back side 222 of housing 210. In some embodiments, the length of the elongated arm 232 may be limited due to space constraints. For example, the cross sections shown in FIGS. 3 and 4A-4C show elongated arm 232 extending approximately ⅔ of the length of housing 210 with the remaining ⅓ reserved for housing other functional components including, but not limited to batteries, computer processing systems, etc.

As previously mentioned, FIG. 5 shows a detail of the cross section shown in FIG. 3 as indicated by the dotted line box 290. Specifically, FIG. 5 shows, in simplified form, an example image capture assembly 240 that includes a motorized gimbal mechanism for actively stabilizing a mounted image capture device (e.g., a camera) 248. In general, a motorized gimbal mechanism may include multiple link arms coupled at one or more motorized rotation joints. The link arms and rotation joints form a mechanical linkage coupling the image capture device 248 to the passive stabilization assembly (e.g., at mounting assembly 236). In response to the detected motion (e.g., using accelerometers or other motion sensors) motors at the rotation joints actuate the link arms about the axes of rotation of the rotation joints to counter the detected motion(s). The combined effect of this actuation by the motors is to stabilize the mounted image capture device 248 relative to a particular frame of reference (e.g., the surface of the Earth). FIG. 5 shows an example embodiment of a motorized gimbal mechanism that is rotatable about two axes using two gimbal motors 242 and 244. As shown in FIG. 5, image capture device 248 can be pitched up and down by actuating motor 244 and rotated by actuating motor 242. In some embodiments, such a two-axis gimbal system may be implemented as part of a hybrid mechanical-digital gimbal system which is described in more detail with respect to FIGS. 11A-11F.

This two-axis configuration is described for illustrative purposes, but is not to be construed as limiting. In some embodiments image capture assembly 240 may include a motorized gimbal providing more or fewer degrees of freedom of motion for mounted image capture device 248.

Figure 6:
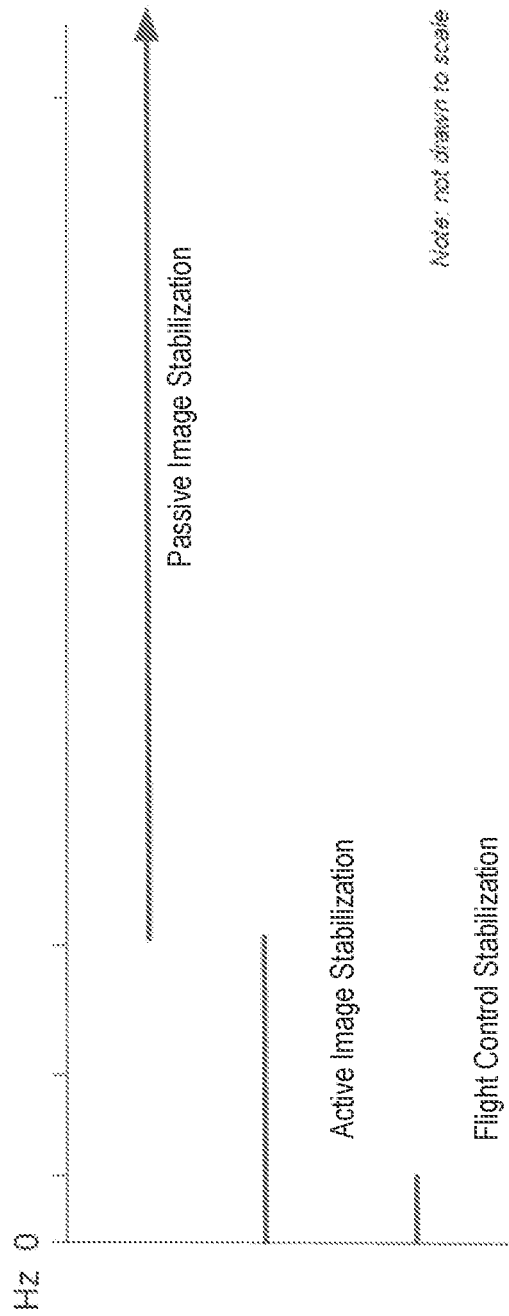
FIG. 6 is a diagram that illustrates how various types of stabilization systems can be employed to counter motion across a range of frequencies.

FIG. 6 is a diagram that illustrates how various types of stabilization systems can be employed to counter motion across a range of frequencies of motion. For example, as shown in the diagram of FIG. 6, active stabilization techniques may generally be more effective at relatively lower frequencies whereas passive stabilization techniques may generally be more effective at relatively higher frequencies. In the example embodiment of quadcopter UAV (e.g., similar to example UA 200) active stabilization techniques (e.g., mechanical stabilization of the image capture device using a gimbal and/or EIS) may effectively stabilize image capture at or below frequencies in the area of 15 Hz. Note that this is just an example observation and would not necessarily apply to all embodiments of the presently described innovations. The range of effectiveness of any given stabilization system will depend on a number of implementation-specific design factors.

Returning to the example of a quadcopter UAV, active stabilization systems may be less effective at stabilizing motion above approximately 15 Hz for a number of reasons.

For example, in any active stabilization system (mechanical or EIS) some degree of latency is likely introduced based on processing of received motion sensor data, generating response commands, and either processing images (EIS) or actuating gimbal motors. This latency may reduce the overall effectiveness of countering motion at higher frequencies (e.g., high frequency vibration introduced by the rotors of a quadcopter UAV in operation). Further, higher frequency motion will generally be associated with lower translational displacement (e.g., high frequency vibration). Active mechanical stabilization of a mounted image capture device may be less effective at countering such small translational motions due to the limited positional accuracy of the motors used in such systems. For example, typical stepper motors that may be utilized in a motorized gimbal mechanism are accurate to about ±.10°. EIS can also run into problems when attempting to counter high frequency motion due to the nature in which the image is captured at optical sensor. In many digital image capture systems (e.g., CMOS) an image is captured at the optical sensor by rapidly scanning across a given field of view (either vertically or horizontally). Due to the time required to scan across the field of view, rapid motion in the scene (e.g., due to high frequency vibration) can lead to a "wavy" effect in the captured images. This effect can in some cases be alleviated with further image processing, however there is a processing efficiency benefit to passively isolating the image capture device from such motion before image capture.

Passive image stabilization, on the other had can be more effective at handling higher frequency motion such as vibration. For example, in the case of a quadcopter UAV similar to UAV 200, the aforementioned counter-balanced suspension system may be effective at isolating a mounted image capture device from translational motion at frequencies beyond the effective range (e.g., above 15 Hz) of an integrated active system. It will be appreciated that due to its unique geometry, the aforementioned counter-balanced suspension system will exhibit a wider effective range that, for example simply mounting the image capture assembly to the UAV housing using vibration isolators.

As also noted in FIG. 6, at very low frequencies, vehicle controls may be utilized to a degree to further stabilize image capture. For example, as will be described in more detail, in some embodiments a UAV may be configured for autonomous navigation utilizing one or more localization and flight planning systems. Such system may be configured to prioritize the stability of the airframe platform when performing maneuvers with a goal of providing stable image capture. Similarly, in the case of a manned craft or remotely-controlled craft using "fly-by-wire" systems, pilot control inputs can be interpreted and corresponding control commands generated to maneuver the craft in a stable manner to enable quality image capture.

Accordingly, to counter a wide range of motion characteristics (e.g., translational motion across a across a wide range of frequencies), an image stabilization system may be implemented that employs both passive and active stabilization techniques, for example as described with respect to FIGS. 3-5. Such systems may be generally referred to as a hybrid active-passive stabilization systems.

Figure 7:
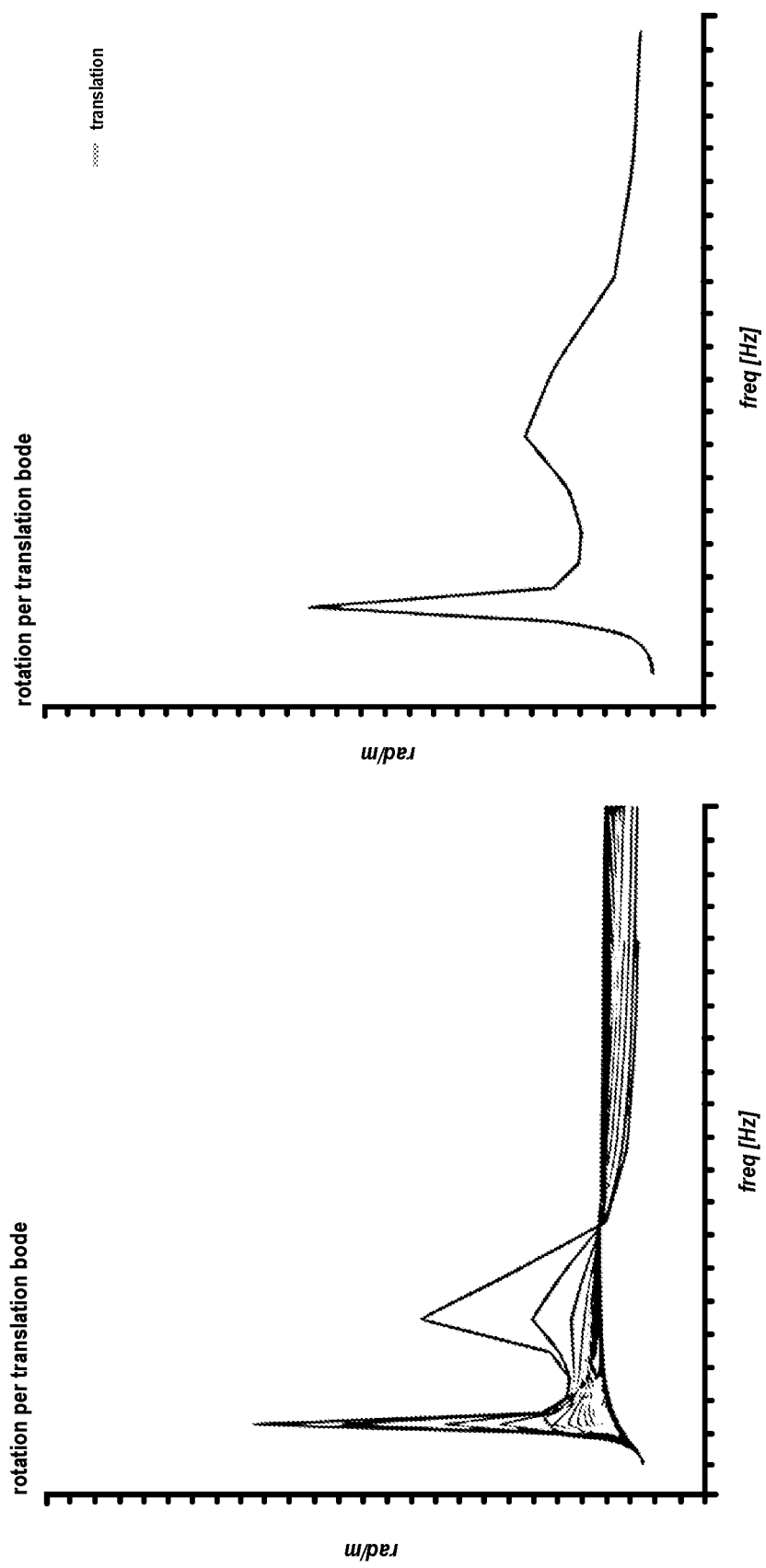
FIG. 7 shows a pair of example bode plots that illustrate how rotational motion can result from translation motion at a range of frequencies in a given kinematic system.

FIG. 7 shows a pair of example bode plots that illustrate how rotational motion can result from translation motion at a range of frequencies in a given kinematic system. A kinematic system with a given set of characteristics (e.g., geometry, materials, etc.) will have a frequency or set of frequencies at which the system will tend to oscillate in the absence of a driving or damping force. This is generally referred to as the "natural frequency" and as shown in FIG. 6, can lead to extreme spikes in oscillating motion at certain frequencies. The plots provided in FIG. 6, are examples provided to illustrate this concept but do not necessarily pertain to any of the systems or components described herein. A person having ordinary skill will understand that in implementing an embodiment of the present innovation, certain characteristics (e.g., geometry, materials) may be adjusted to reduce the effects of such aforementioned spikes across a range of frequencies of translational motion.

FIGS. 8A-13 show a series of views that illustrate in greater detail a particular embodiment of an example UAV 800 (e.g., similar to UAV 200 described with respect to FIGS. 2-5) that incorporate some of the aforementioned image stabilization techniques.

Figure 8A:
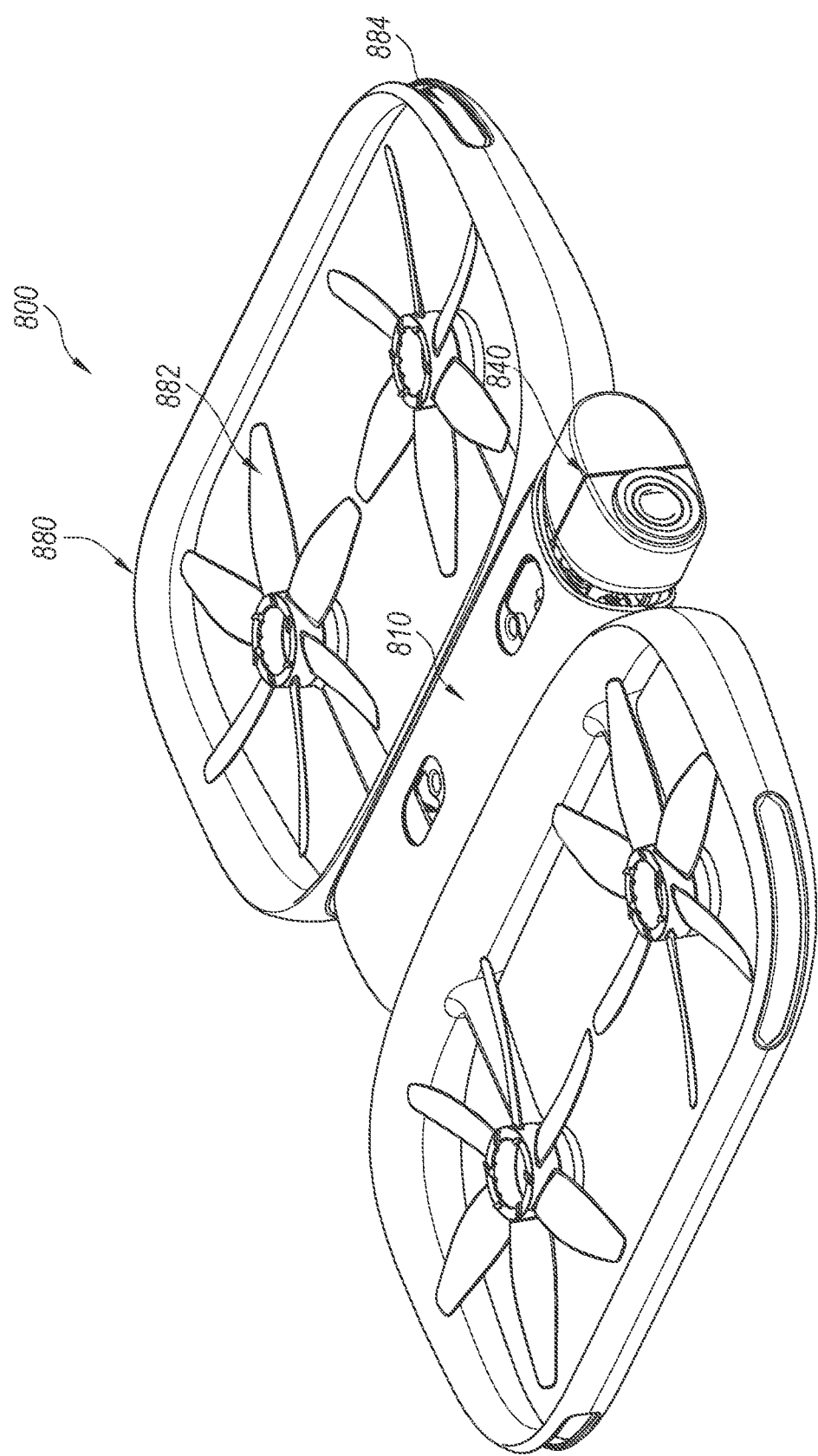
FIG. 8A shows an isometric view of example UAV similar to the UAV depicted in FIG. 2 that incorporates one or more of the novel stabilization techniques described herein.
Figure 8B:
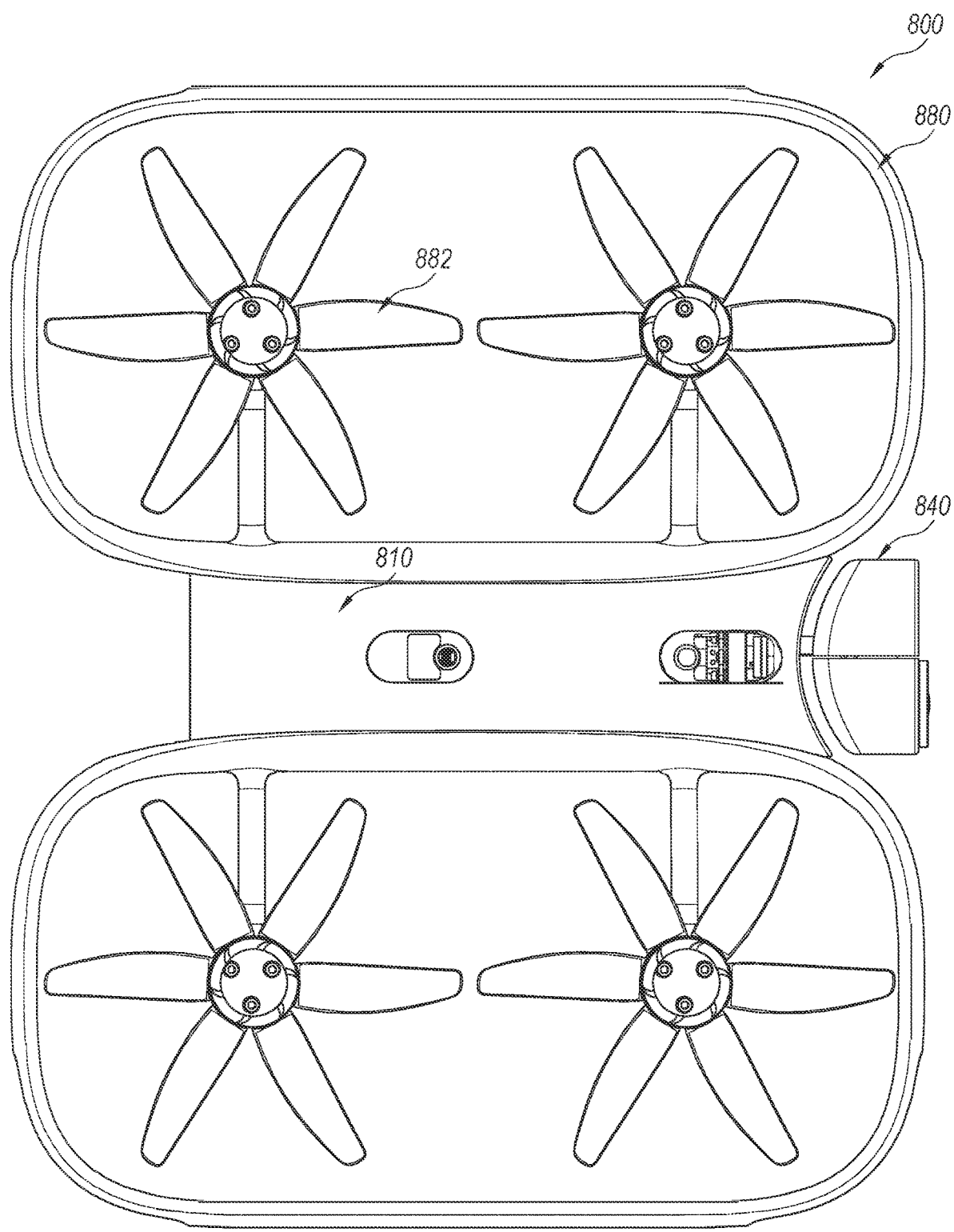
FIG. 8B shows a top view of the example UAV depicted in FIG. 8A.

FIG. 8A is an isometric view of example UAV 800 in the form of a quadcopter. Similar to UAV 200 described with respect to FIGS. 2-5, UAV 800 includes a central body housing 810 with a forward facing image capture assembly 840 that includes an image capture device for capturing images (including video) of the surrounding physical environment while UAV 800 is in flight. As shown in FIG. 8A, in this example embodiment, UAV 800 includes rotor assemblies on opposing sides of the central body housing 810. Each rotor assembly includes one or more rotors 882 that are protected by a perimeter structure 880, substantially extending around the blades of the rotor assembly 880. Perimeter structure 880 can protect the one or more rotors 882 from contact with objects in the physical environment, while UAV 800 is in flight and in some embodiments may house sensors 884 (e.g., optical sensors) used for autonomous navigation. FIG. 8B shows a top view of example UAV 800 that further illustrates how the perimeter structure 880 extends around the blades of the rotors 882. The concept of a perimeter structure is described in more detail in U.S. application Ser. No. 15/164,679, entitled, "PERIMETER STRUCTURE FOR UNMANNED AERIAL VEHICLE," filed May 25, 2016, the contents of which are hereby incorporated by reference in their entirety. Note, the rotors are illustrated in FIG. 8A to provide structural context for example UAV 800, but are otherwise not essential to the image stabilization techniques described herein.

Similarly described with respect to UAV 200, the housing 810 of UAV 800 may include one or more walls surrounding an interior space of the housing 810. The interior space has an opening at the "front end" of the housing 810 through which the image capture assembly 840 protrudes and is defined by the interior surfaces of one or more of the walls of the housing. The walls of the housing 810 and perimeter structure 880 can be made of one or more structural components made of any material or combination of materials that have strength and weight characteristics suitable for use in an aircraft. For example, the walls of housing 810 and perimeter structure 880 can be made of plastic, metal (e.g., aluminum), carbon fiber, synthetic fiber (e.g., Kevlar®), or some sort of composite material such as carbon or glass fiber embedded in an epoxy resin. Specifically, in example UAV 800, the walls of housing 810 and perimeter structure 880 may be made of a plurality of plastic structural components formed through an injection molding and/or 3-D printing process. The plurality of components can be assembled and fastened to each other using any of integrated clips, screws, bolts, glue, welding, soldering, etc.

Figure 8C:
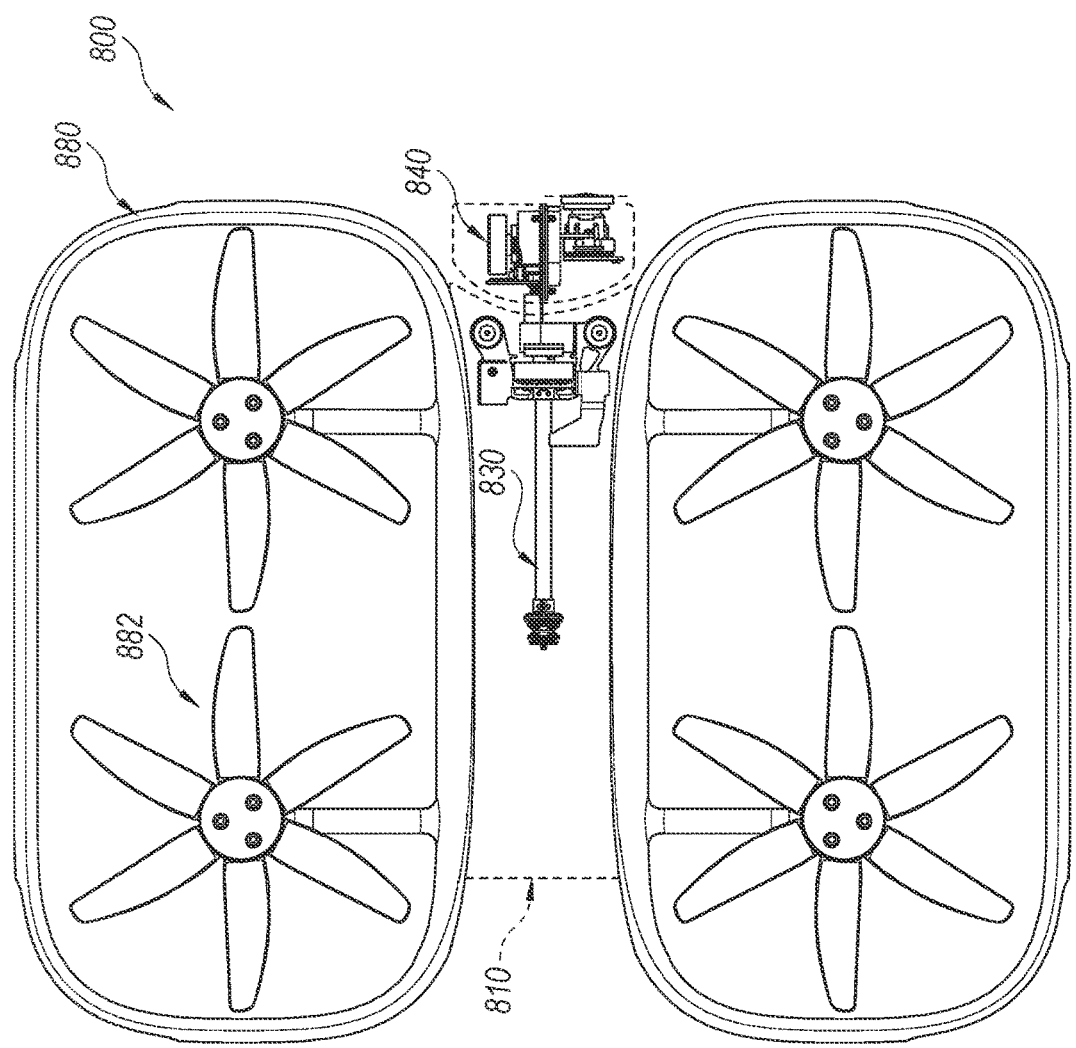
FIG. 8C shows a top view of the example UAV depicted in FIG. 8A with the housing hidden to reveal the arrangement of components related to image stabilization systems.
Figure 8D:
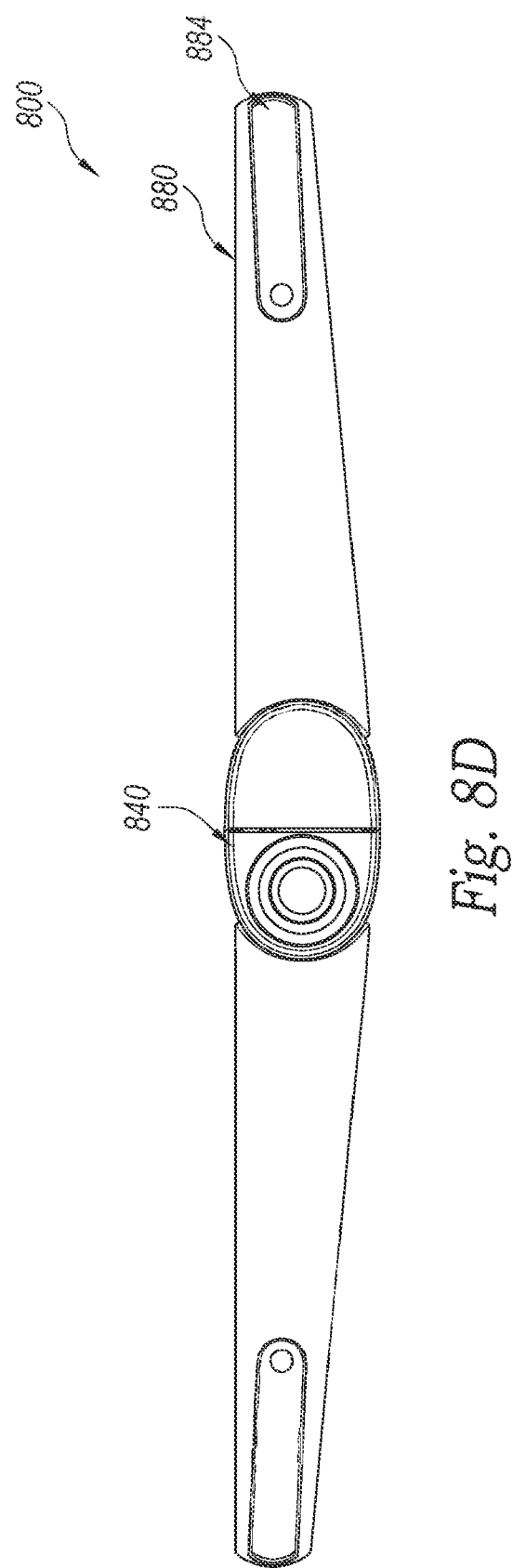
FIG. 8D shows a front view of the example UAV depicted in FIG. 8A.

FIG. 8C shows a top view of example UAV 800 similar to the top view shown in FIG. 8B, except that the walls of the housing 810 are hidden to show the relative arrangement of components related to the image stabilization systems. As shown in FIG. 7C, UAV 800 includes a passive stabilization assembly 830 arranged within the interior space of housing 810. Coupled to the passive stabilization assembly 830 is the image capture assembly 840 which can include various active stabilization components that are described in more detail later. Forward mounted image capture assembly and associated passive stabilization assembly 830 arranged within the interior space of housing 810 allows for the low profile of UAV 800 as evident in the front view of the vehicle shown in FIG. 8D. Contrast the profile of UAV 800 shown in FIG. 8D with the profile of UAV 100a shown in FIG. 1A.

Figure 9A:
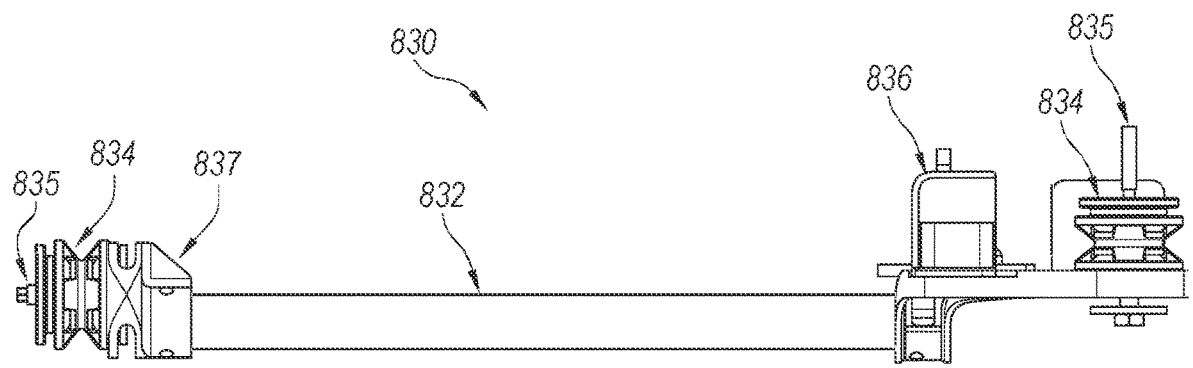
FIG. 9A shows a side view of a passive stabilization assembly configured for use with the UAV depicted in FIG. 8A.
Figure 9B:
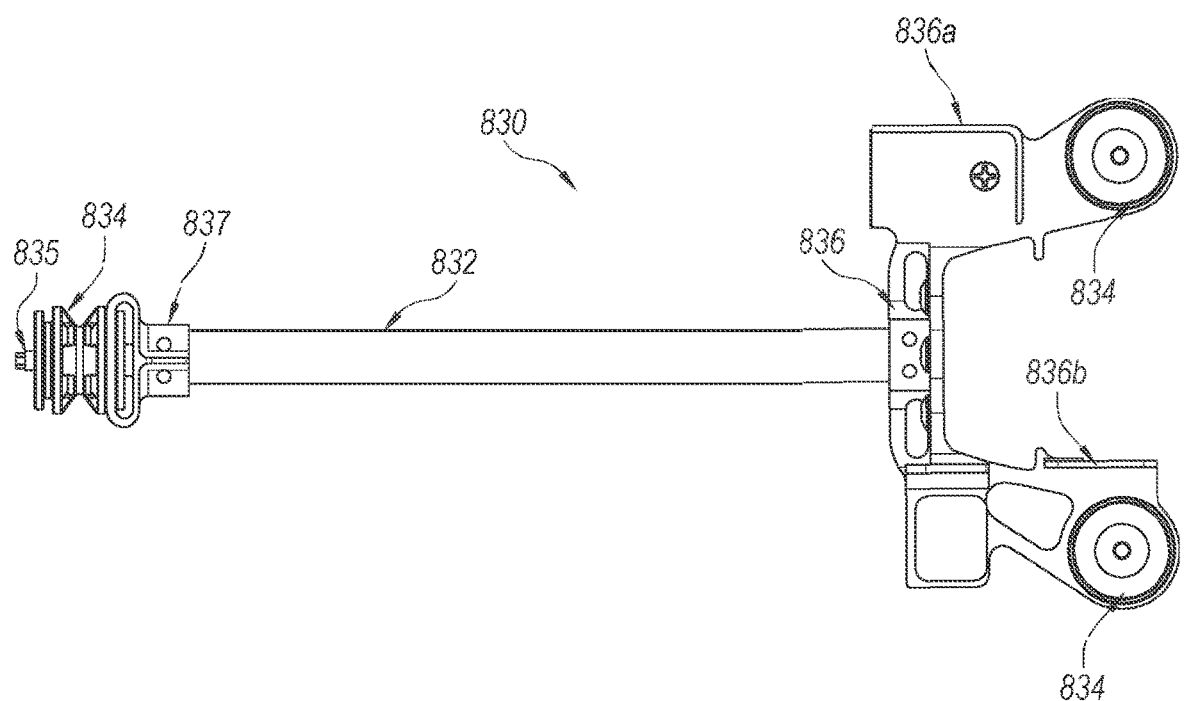
FIG. 9B shows a top view of the passive stabilization assembly depicted in FIG. 9A.
Figure 9C:
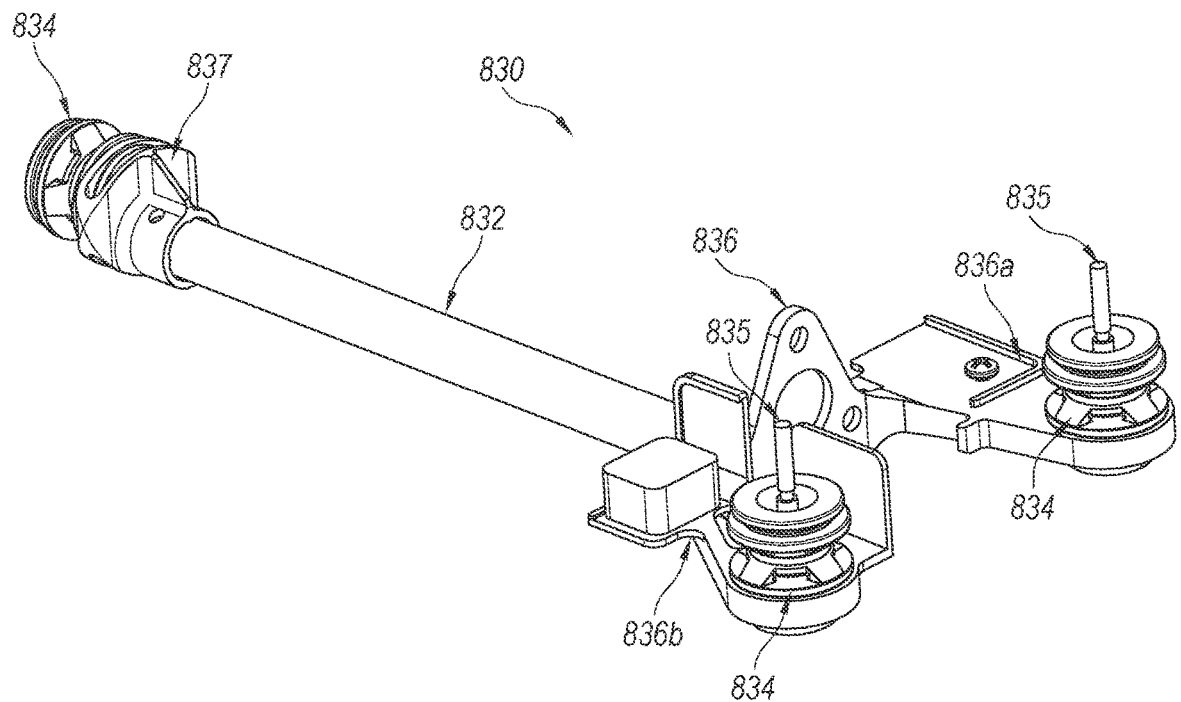
FIG. 9C shows a front isometric view of the passive stabilization assembly depicted in FIG. 9A.
Figure 9D:
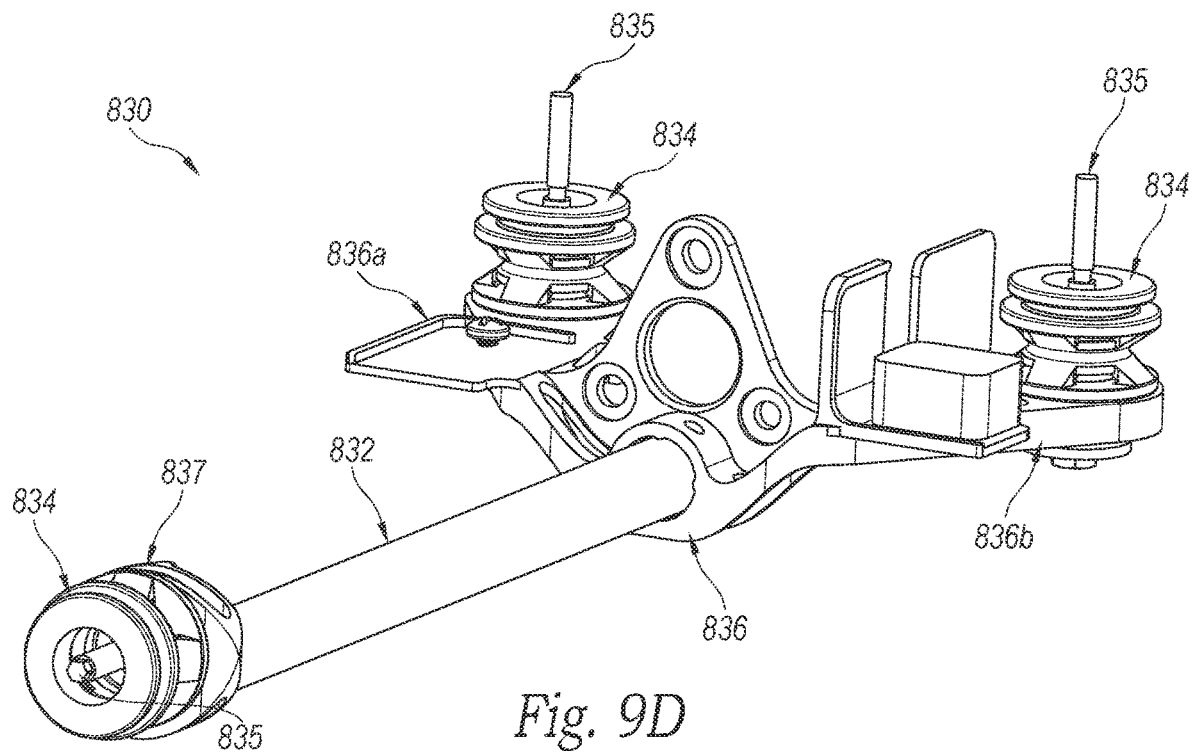
FIG. 9D shows a rear isometric view of the passive stabilization assembly depicted in FIG. 9A.
Figure 9E:
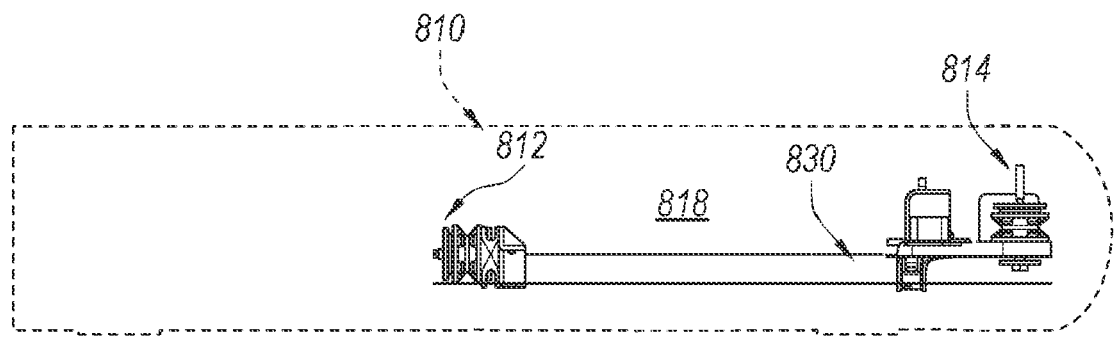
FIG. 9E shows a side view of the passive stabilization assembly depicted in FIG. 9A in the context of the housing of the UAV depicted in FIG. 8A.
Figure 9F:
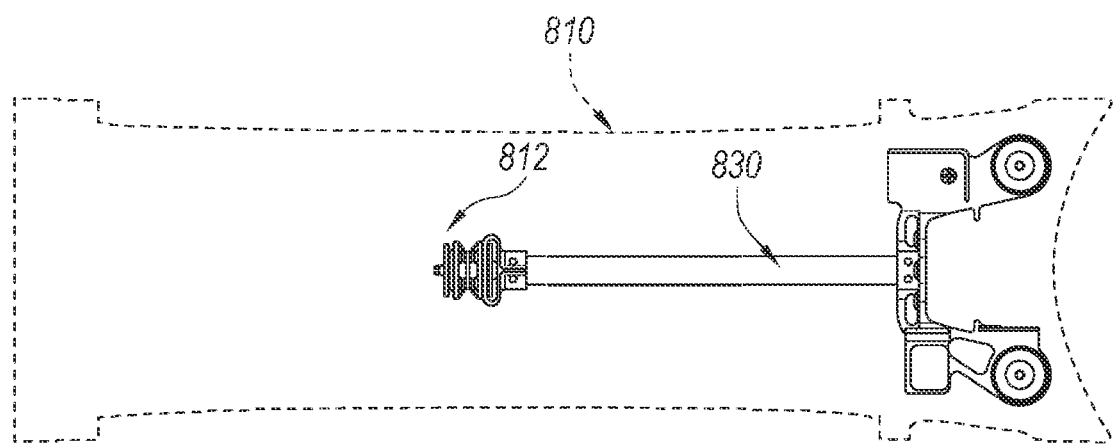
FIG. 9F shows a top view of the passive stabilization assembly depicted in FIG. 9A in the context of the housing of the UAV depicted in FIG. 8A.
Figure 9G:
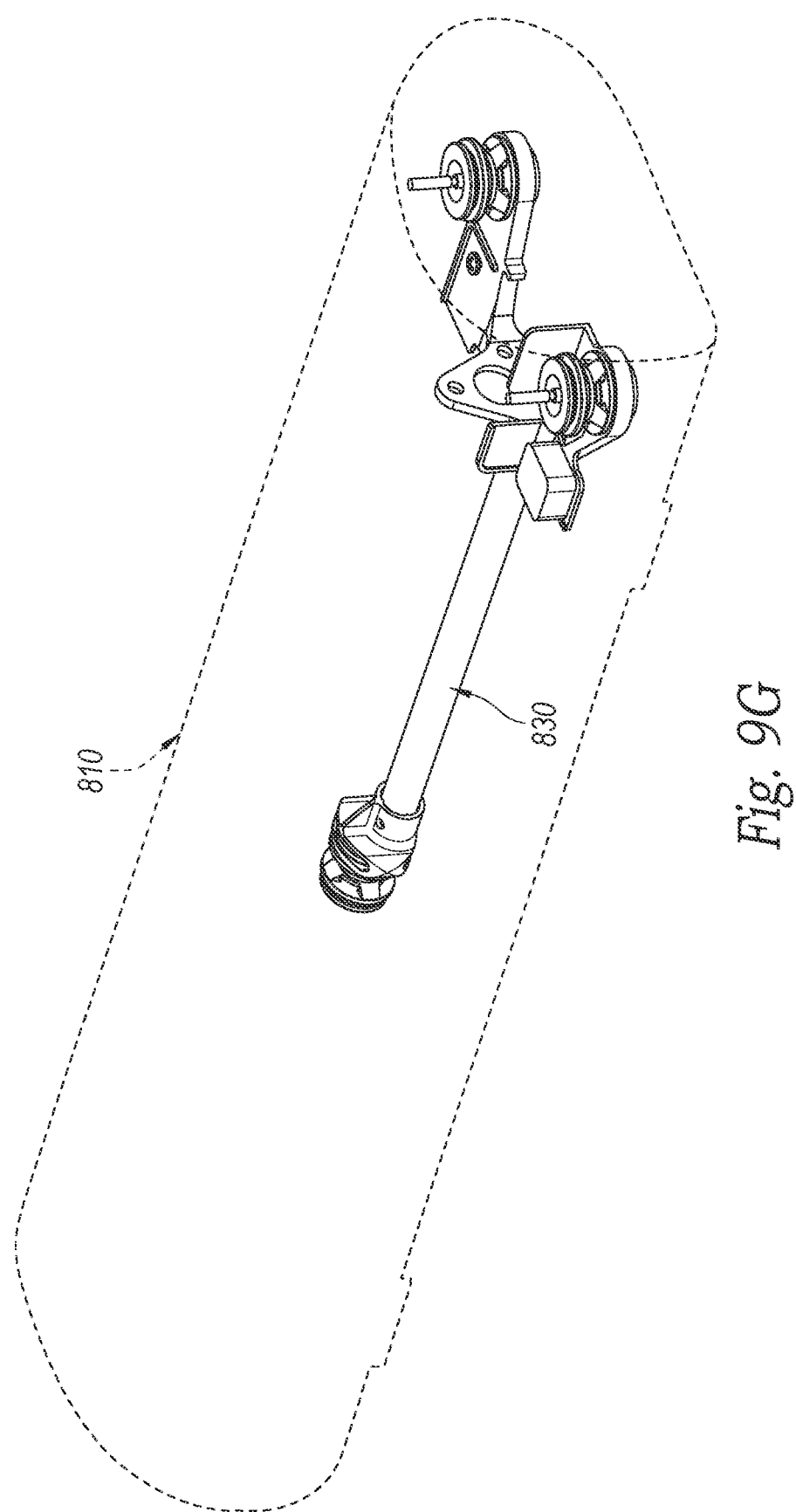
FIG. 9G shows an isometric view of the passive stabilization assembly depicted in FIG. 9A in the context of the housing of the UAV depicted in FIG. 8A.

FIGS. 9A-9G show a series of detailed views of the example passive stabilization assembly 830 shown in FIG. 8C. Specifically, FIG. 9A shows a side view, FIG. 9B shows a top view, FIG. 9C shows a front isometric view, and FIG. 9D shows a rear isometric view. Similarly, FIG. 9E, 9F, and 9G show a side view, top view, and isometric view (respectively) of example passive stabilization assembly 830 in the context of the housing 810 of UAV 800.

As show in FIGS. 9A-9D, similar to the passive stabilization assembly of UAV 200 described with respect to FIGS. 2-4C, passive stabilization assembly 830 includes an elongated arm 832, a mounting assembly 836 and a plurality of isolators 834 through which the assembly 830 is coupled to interior surfaces of the housing 810.

In some embodiments, elongated arm 832 is a cylindrical structure of a certain length, for example as shown in FIG. 9A. Note however, that example elongated arm 832 is shown in FIGS. 9A-9D as being a straight cylinder-shaped member with generally uniform thickness. This example is provided for illustrative purposes, but should not be construed as limiting. In other embodiments the "elongated arm" may not be a single member or may have a different shape. For example, to accommodate geometry constraints within the interior space of housing 810, the elongated arm 832 has a proximal end and a distal end. The proximal end is coupled to the mounting assembly 836 and the distal end is dynamically coupled to an interior surface (e.g., an interior back surface 812, shown in FIGS. 9E-9F) of housing 810 via an isolator 834. As shown in FIGS. 9A-9D, the distal end of elongated arm 832 may be coupled to the isolator 834 via a mounting clip 837. Example elongated arm 832 can be made of any material or combination of materials that have strength and weight characteristics suitable for use in a UAV such as UAV 800. For example, elongated arm can be made of plastic, metal (e.g., aluminum), carbon fiber, synthetic fiber (e.g., Kevlar®), or some sort of composite material such as carbon or glass fiber embedded in an epoxy resin and may be formed using any process appropriate for the selected material including injection molding, 3-D printing, machining, etc.

As with mounting assembly 236 described with respect to UAV 200, mounting assembly 836 is configured to dynamically couple to an interior surface (e.g., an interior top surface 814, shown in FIG. 9E) of housing 810 via isolators 834. Specifically, example, mounting assembly 836 includes a first mounting assembly arm 836a extending laterally from an axis of the elongated arm 832 and a second mounting assembly arm 836b extending laterally from the axis of the elongated arm 832, opposite the first mounting assembly arm 836a, for example as shown in the top view provided in FIG. 9B. At each of the arms 836a and 836b, the mounting assembly 836 is dynamically coupled to an interior surface (e.g., an interior top surface) of housing 810 via an isolators 834. Accordingly, example passive stabilization assembly 830 is dynamically coupled to the housing 810 of UAV 800 at three points. This provides a balanced configuration, but is not necessary in all embodiments. In other embodiments, the passive stabilization assembly may be dynamically coupled to housing 810 at fewer or more points and at different locations. For example, each arm 836a-b may include two isolators 834, one coupled a top interior surface and one coupled to a bottom interior surface. Alternatively, in some embodiments, the mounting assembly 836 may include more than the two arms shown in FIGS. 9A-9D.

As with isolators 234, isolators 834 may in some embodiments act as spring dampers to isolate the dynamic components (i.e., passive stabilization assembly 830 and the mounted image capture assembly 840) from certain rotational and/or translational motion by UAV 800. For example, in some embodiments each isolator 834 may act as a spring damper to isolate motion in each of the x, y, and z directions. Isolators 834 are described in more detail with respect to FIGS. 10A-10C, however generally speaking isolators 834 may be formed of an elastomer material and based on their geometry and the properties of the elastomer material may exhibit a 1:1:1 ratio of compression stiffness to tensile stiffness to shear stiffness. In other words, each isolator 834 may act as a spring damper that responds uniformly in the x, y, and z directions. Note, in FIGS. 9A-9D, each isolator 834 has a uniform configuration. This may help with manufacturing and part replacement efficiency, but is not necessary in all embodiments. For example, in some embodiments the isolator coupling the elongated arm 832 to housing 810 may be of a first type and the isolators coupling the mounting assembly 836 to housing 810 may be of a different type. A person having ordinary skill will recognize that this is a design consideration and will be affected by the geometries and arrangement of dynamic portions with respect to housing 810.

As further shown in FIGS. 9A-9D, one or more of the isolators 834 may be associated with a corresponding mechanical stopper 835 configured to limit the range of motion of the passive stabilization assembly 830 relative to the housing 810 of UAV 800. The mechanical stoppers 835 may be included to prevent interference or contact in general between the components of the passive stabilization assembly 830 (and any mounted image capture assembly 840) with other components associated with example UAV 800. As shown in FIGS. 9A-9D, in an embodiment the mechanical stoppers 835 include pegs of some type (e.g., made out of plastics, metal, etc.) that are arranged within an open interior space of the isolators 834. Note, the specific geometry of the example isolators 834 is more readily apparent in FIGS. 10A-10C. In other embodiments, the mechanical stoppers 835 may be place at any other point relative to the passive image stabilization assembly 830 to effectively limit motion of the assembly. However, an added benefit to arranging the stopper 835 as shown in FIGS. 9A-9D is that when assembly 830 is in motion and reaches the said limit, the stopper 835 contacts the interior surface of the elastomer isolator 834 resulting in a soft stop instead of contacting a rigid surface (e.g., of elongated arm 832) which (if not padded) may result in a loud sound and/or damage to the components.

It will be appreciated that the passive stabilization assembly 830 depicted in FIGS. 9A-9D is an example provided for illustrative purposes and is not to be construed as limiting. In other embodiments, a passive stabilization assembly may include more or fewer discrete components than as shown. For example, in an embodiment the elongate arm 232, mounting bracket 237, and mounting assembly 236 may collectively comprise a single part, for example formed through an injection molding, machining, or 3-D printing process.

Figure 10A:
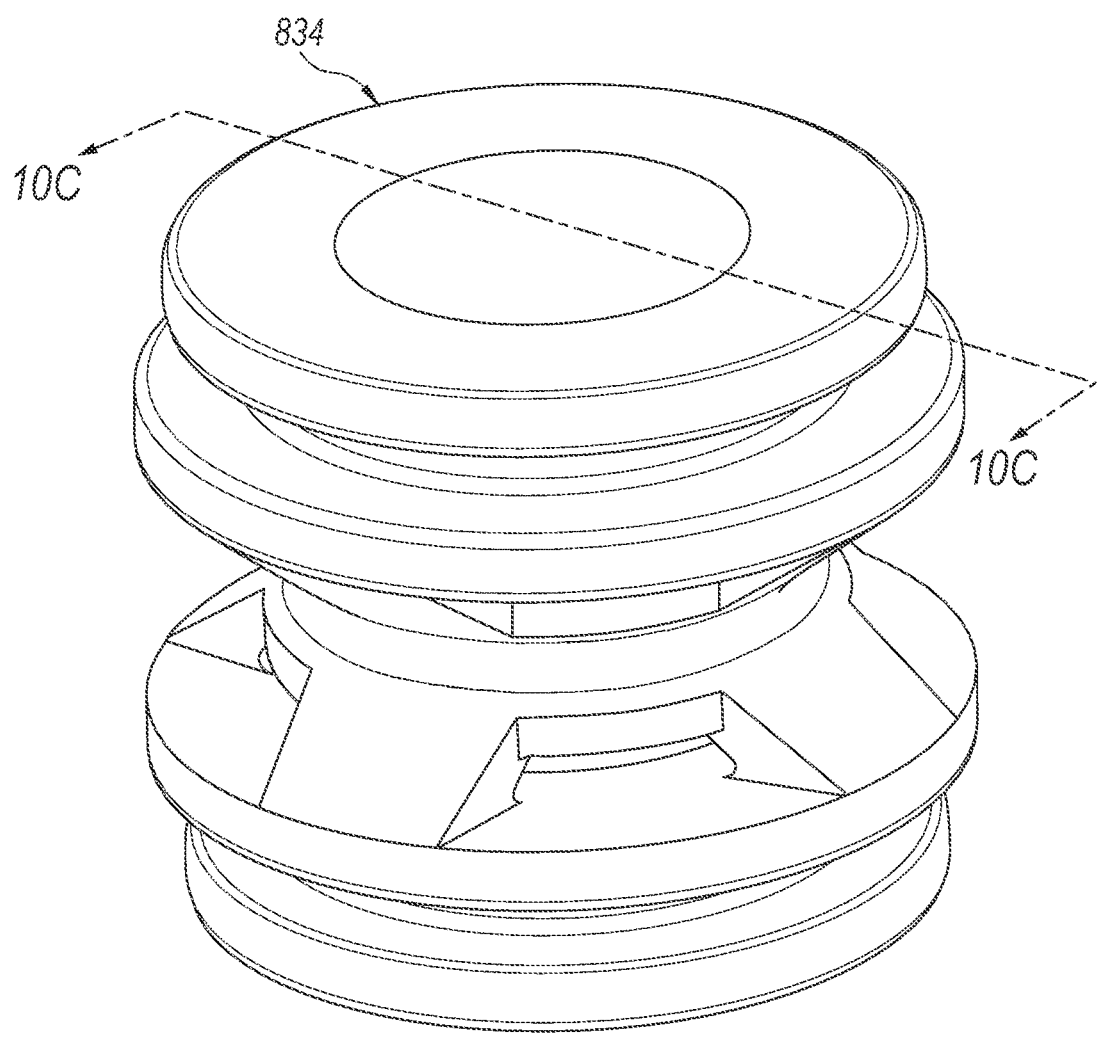
FIG. 10A shows an isometric view of an isolator configured for use with the passive stabilization assembly depicted in FIG. 8A.
Figure 10B:
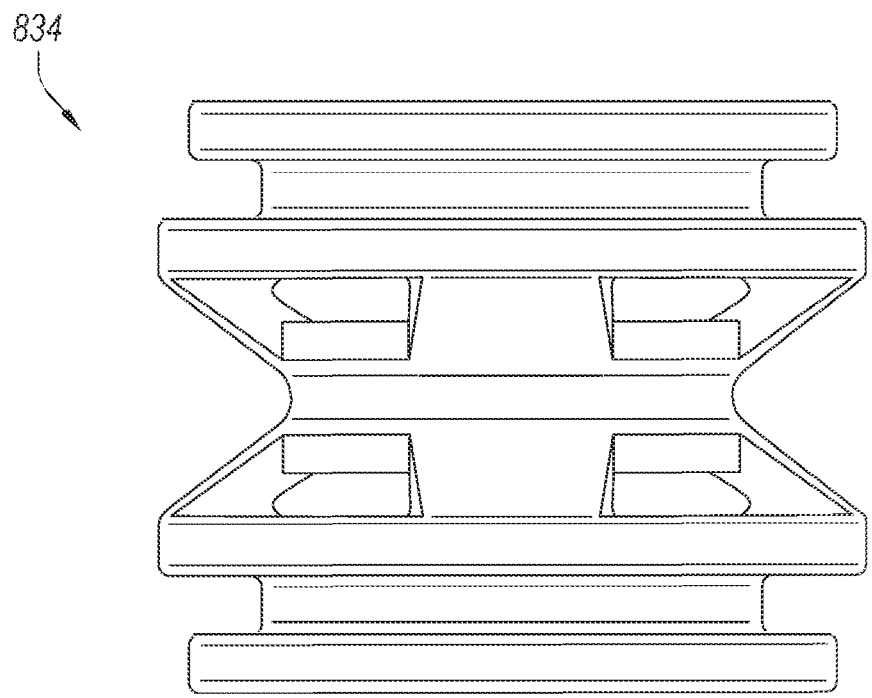
FIG. 10B shows a side view of the isolator depicted in FIG. 10A.
Figure 10C:
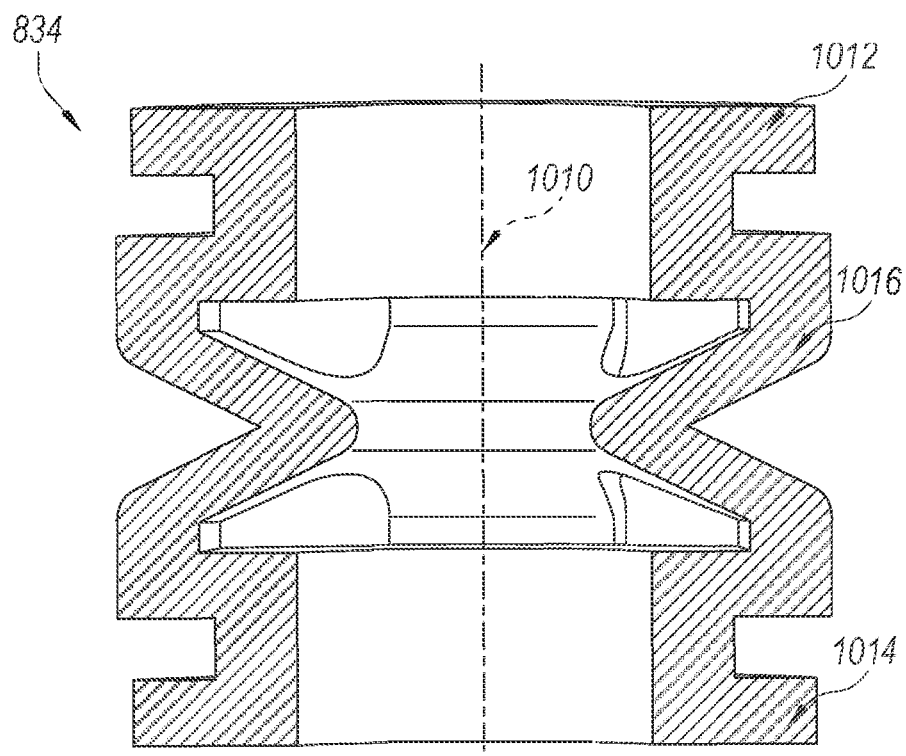
FIG. 10C shows a cross-section view of the isolator depicted in FIG. 10A.

FIGS. 10A-10B show a series of views of an example isolator 834, for example as shown in FIGS. 9A-9D. Specifically, FIG. 10A shows an isometric view of isolator 834, FIG. 10B shows a side view of isolator 834, and FIG. 10C shows a cross section (as indicated by cross section label 10C in FIG. 10A) of isolator 834. As shown in FIGS. 10A-10C, isolator 834 is generally cylindrical in nature but includes unique geometry configured to achieve the previously mentioned 1:1:1 ratio of compression stiffness to tensile stiffness to shear stiffness. Currently available passive vibration isolators typically include a solid portion of elastic material, for example in the form of a pad, that is placed between two rigid components. Conversely, as shown in FIGS. 10A-10C example isolator 834 is formed to include structural elements that affect spring and damping characteristics. The unique geometry of isolator 834 is more readily apparent when viewed in cross section in FIG. 10C. As shown in FIG. 10C, isolator 834 is cylindrical in nature and has a hollow portion extending along axis 1010. The walls forming the structure of isolator 834 about axis 1010 can conceptually be separated into a top portion 1012 configured to couple to a first surface (e.g., top interior surface 814 of housing 810) and a bottom portion 1014 configured to couple to a second surface (e.g., that of mounting assembly 836). The two portions 1012 and 1014 are joined at a center portion 1016 that can include one or more angled members that are arranged to act as spring dampers in each of the x, y, and z directions. Note that as shown in FIGS. 10A-10C, isolator 834 includes four such angled members symmetrically distributed about axis 1010 with open space between each member. This arrangement may be implemented to save on material costs and/or to achieve desired spring/dampening characteristics, however is not necessary in all embodiments. For example, depending on the material chosen, the center portion 1016 may include a continuous wall about axis 1010 much like the top portion 1012 and bottom portion 1014. Further the angles of the members of the center portion 1016 are exemplary and will differ based on the particular requirements of a given implementation.

As mentioned, in some embodiments isolators 834 may be made of one or more elastomer materials (e.g., natural and/or synthetic rubbers). In general, the selected material should be suitable for forming into complex geometries (e.g., isolator 834 shown in FIGS. 10A-10C), and should exhibit relatively low stiffness and relatively high damping characteristics. With respect to the damping characteristics, in the example embodiment of isolator 834, may exhibit a tangent delta (i.e., energy loss factor) in the order of 0.6 and above, a beta in the order of 3 and above, and/or a rebound elasticity of approximately 30% or less. As an example, use of Elastosil® R 752/50 as an elastomer material along with the geometry of isolator 834 described with respect to FIGS. 10A-10C may provide suitable stiffness and damping characteristics to passively stabilize image capture assembly 840 with respect to housing 810. Note that this material and the recited example stiffness and damping characteristics may work for example isolators 834 in the example embodiment of UAV 800, but do not necessarily apply to all embodiments of the presently described innovations. For example, the appropriate damping characteristics for a given isolator will heavily depend on the characteristics of the object (e.g., image capture device) to be stabilized, the stabilization requirements of the given implementation, and the expected motion characteristics to be countered. A person having ordinary skill will recognize that these are design considerations that will change for each embodiment.

Figure 11A:
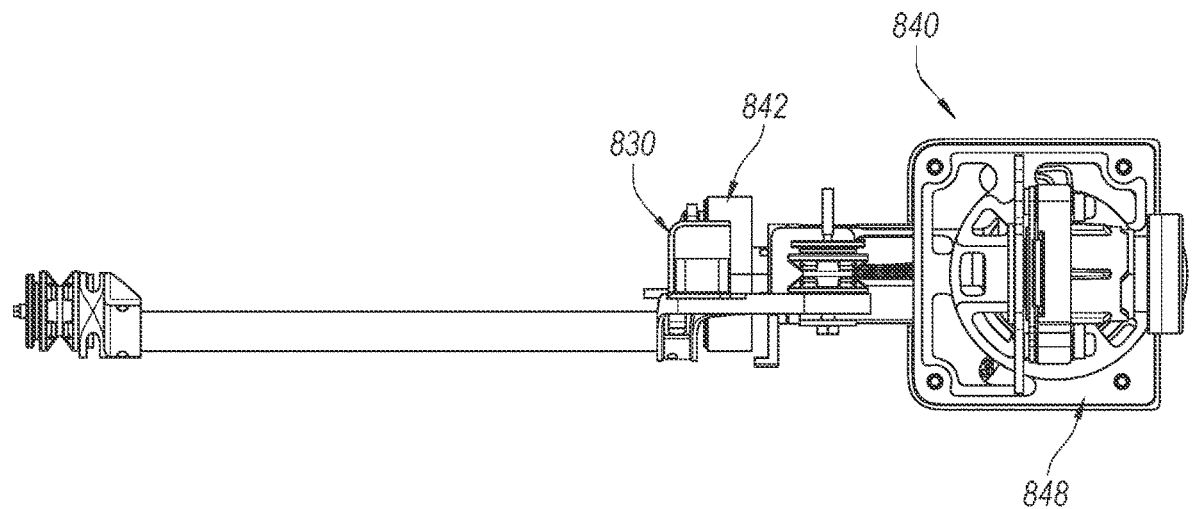
FIG. 11A shows a side view of an image capture assembly coupled to the passive stabilization assembly depicted in FIG. 9A.
Figure 11B:
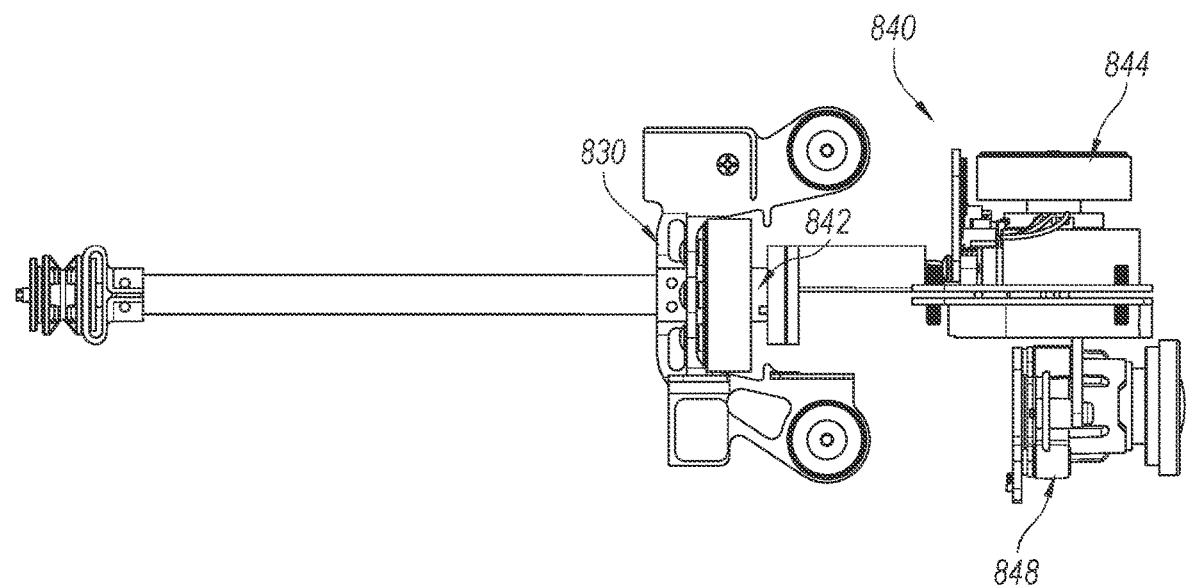
FIG. 11B shows a top view of the image capture assembly of FIG. 11A coupled to the passive stabilization assembly depicted in FIG. 9A.
Figure 11C:
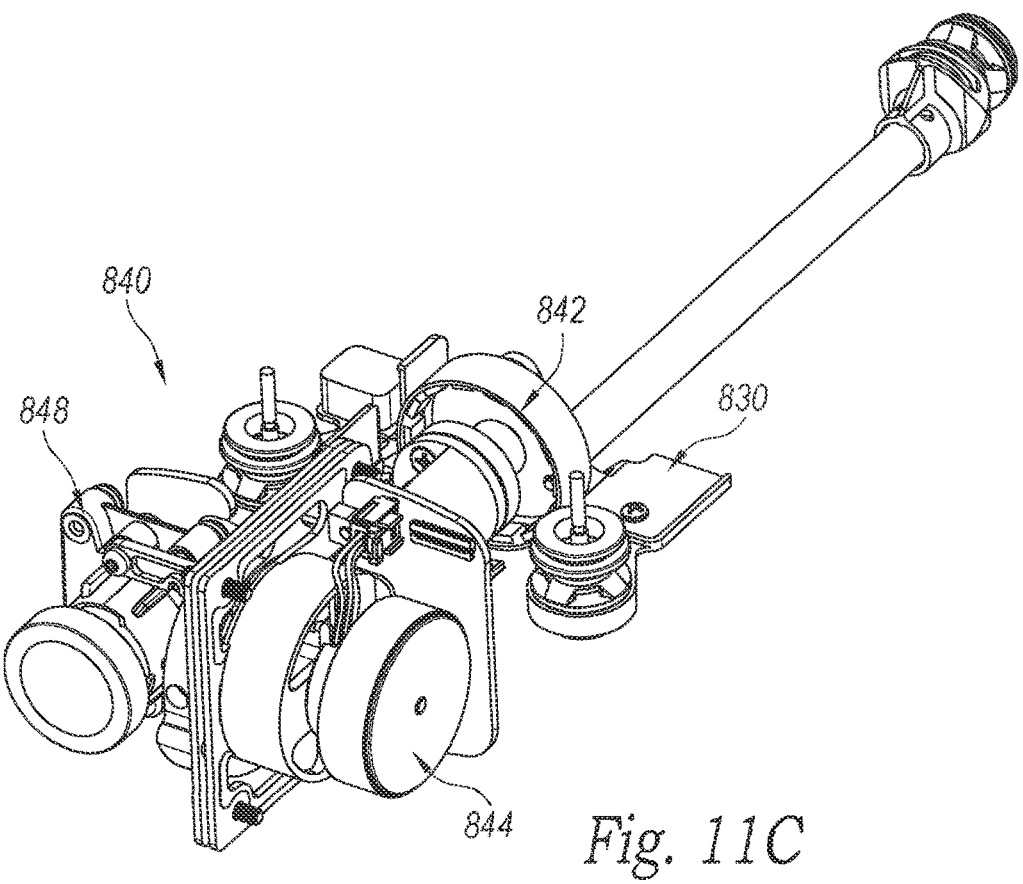
FIG. 11C shows a first front isometric view of the image capture assembly of FIG. 11A coupled to the passive stabilization assembly depicted in FIG. 9A.
Figure 11D:
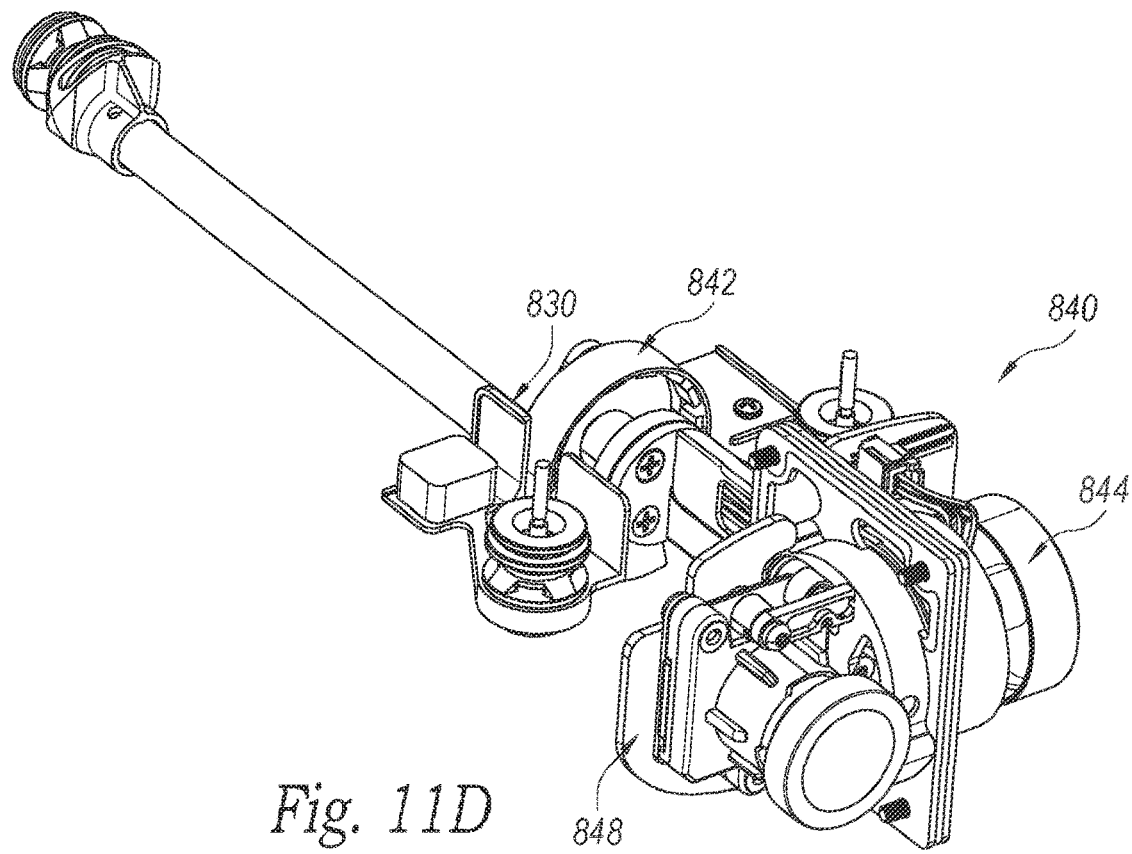
FIG. 11D shows a second front isometric view of the image capture assembly of FIG. 11A coupled to the passive stabilization assembly depicted in FIG. 9A.
Figure 11E:
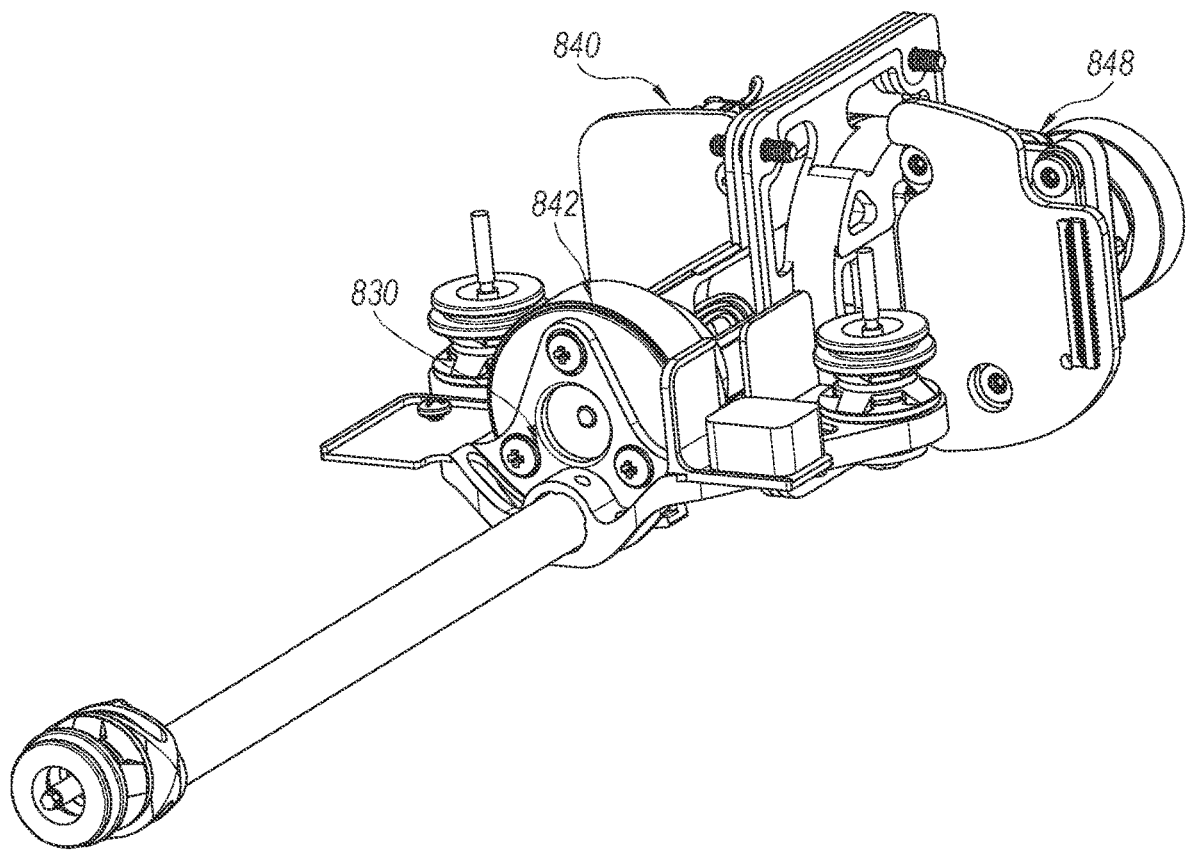
FIG. 11E shows a first rear isometric view of the image capture assembly of FIG. 11A coupled to the passive stabilization assembly depicted in FIG. 9A.
Figure 11F:
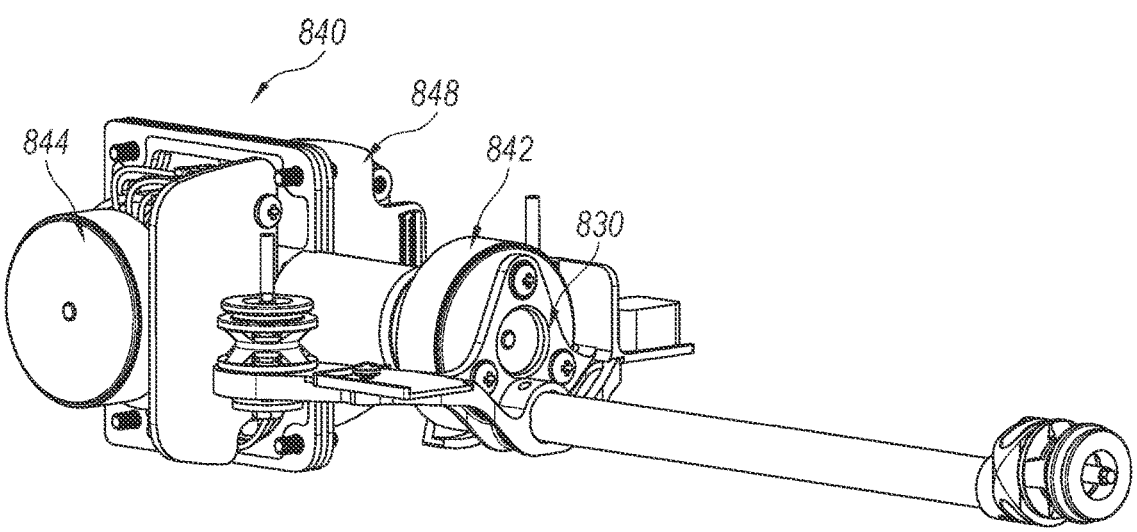
FIG. 11F shows a second rear isometric view of the image capture assembly of FIG. 11A coupled to the passive stabilization assembly depicted in FIG. 9A.

FIGS. 11A-11F show a series of detailed views of an image capture assembly 840 coupled to the example passive stabilization assembly 830 shown, for example, in FIGS. 9A-9G. Specifically, FIG. 11A shows a side view, FIG. 11B shows a top view, FIG. 11C shows a first front isometric view, FIG. 11D shows a second front isometric view, FIG. 11E shows a first rear isometric view, and FIG. 11F shows a second rear isometric view.

As show in FIGS. 11A-11F, example image capture assembly 840 includes an image capture device (e.g., one or more digital cameras) and an active stabilization system in the form of a motorized gimbal mechanism (as indicated by gimbal motors 842 and 844). As previously discussed an active stabilization system may be effectively utilized to counter lower frequency/higher magnitude changes in position/orientation of UAV 800. In this sense, the active stabilization systems of assembly 840 may work together with the passive stabilization provided by assembly 830. Note, however, that active stabilization may not be necessary in all embodiments. For example, it is contemplated that in some embodiments image capture assembly includes only an image capture device 848 coupled to passive stabilization assembly 830. In such embodiments, the image capture device 840 may or may not have its own internal active stabilization systems (e.g., EIS and mechanical stabilization of the optical sensor/lens).

The motorized gimbal mechanism of assembly 840 shown in FIGS. 11A-11F is similar to as described with respect to the detail of FIG. 5. That is to say that the mechanism shown in example assembly 840 includes two motors 842 and 844 that serve as rotation joints in a mechanical linkage coupling the image capture device 848 to the passive stabilization assembly 830. In response to detected motion (e.g., by any of housing 810, assembly 830, or assembly 840), the motors 842, 844 are actuated (i.e., rotated) to adjust the orientation of image capture device 848 about one or two axes to counter the motion. For example, as shown in FIGS. 11A-11F, motor 842 would rotate image capture device 848 about a first axis extending along the length of housing 810 and motor 844 would rotate image capture device 848 about a second axis perpendicular to the first axis, thereby adjusting the pitch of image capture device 848 relative to housing 810.

In some embodiments motors 842 and/or 844 may comprise a brushless electric motor. Brushless electric motors typically include a rotor component with permanent magnets and a stator component that includes coiled conductors that form electromagnets. As electrical current is applied through the coils of the stator component with the resulting electromagnetic force interacting with the permanent magnets of the rotor component, thereby causing the rotor component to rotate. In some embodiments, motors 842 and/or 844 may comprise a specific type of brushless motor commonly referred to as an "outrunner" motor. An "outrunner" motor can generally be understood as a type of brushless electric motor that spins an outer shell around its windings as opposed to just spinning a rotor axle. For example, an outrunner brushless electric motor may include a stator assembly coupled to a rotor assembly. The stator assembly may include a generally cylindrical stator housing coupled to and surrounding a stator stack that includes multiple stator coils (e.g., made of copper) and optionally stator teeth that can divide an induced electromagnet into multiple sections. The stator stack may be arranged about an axle bearing.

Similarly, the rotor housing may include a generally cylindrical housing coupled to and surrounding an axle configured to be placed within the axle bearing of the stator housing. The rotor housing further includes permanent magnets arranged to be in close proximity with the stator stack when the motor is assembled. As current is applied through the coils of the stator stack, and electromagnetic fore is induced, which in turn causes the rotor assembly to rotate about the axle (due to the opposing magnetic force caused by the affixed permanent magnets). Brushless electric motors provide an accurate means for making fine adjustments to the position and/or orientation of a mounted image capture device 848. However, a person having ordinary skill will recognize that other types of motors may be implemented depending on the particular requirements of a given embodiment.

In some embodiments, this two-axis motorized gimbal configuration may be part of a hybrid mechanical-digital gimbal system that mechanically adjusts the orientation of the image capture device 848 about one or two axes while digitally transforming captured images (e.g., using EIS) to simulate changes in orientation about additional axes. Further in some embodiments, a hybrid mechanical-digital gimbal system may be implemented with fewer motors than as shown in FIGS. 11A-11F. For example, consider an image capture assembly similar to assembly 840, but that includes only motor 844. In this example, motor 844 may handle active adjustments in the pitch of image capture device 848 while adjustments in roll and yaw are handled digitally, for example, by processing the captured digital images to rotate (roll) and pan (yaw) the field of view. Still further, in some embodiments, particularly those in which UAV 800 includes autonomous navigation capabilities, the UAVs flight controls may be implemented as part of the hybrid mechanical digital gimbal system. For example, consider again an image capture assembly that includes only motor 844. Again, motor 844 might handle active adjustments in the pitch of image capture device 848 while roll adjustments are handled digitally in the captured images. Yaw adjustments, in this example, could then be handled by the flight control systems through changing the orientation of the entire aerial platform (i.e., housing 810 of UAV 800). Such a configuration may be beneficial because it reduces the mechanical complexity of the system (only one gimbal motor), and reduces the image storage and processing requirements (only rotational transforms and no panning).

An example hybrid mechanical-digital gimbal system has been described for illustrative purposes, but is not to be construed as limiting. Other hybrid mechanical-digital gimbal systems may be arranged other than as described above. For example, depending on the implementation, in some embodiments, it may be beneficial to handle pitch adjustments digitally and roll adjustments mechanically. Further, a hybrid mechanical-digital gimbal mechanism is not a necessary feature in all embodiments. For example, as previously mentioned, in some embodiments, the image capture device 848 may be simply coupled directly to the passive stabilization assembly 830. In other embodiments, image capture device 848 may be coupled to the passive stabilization assembly 830 via a motorized gimbal with more than two degrees of freedom (e.g., a three-axis or six-axis gimbal).

Figure 12A:
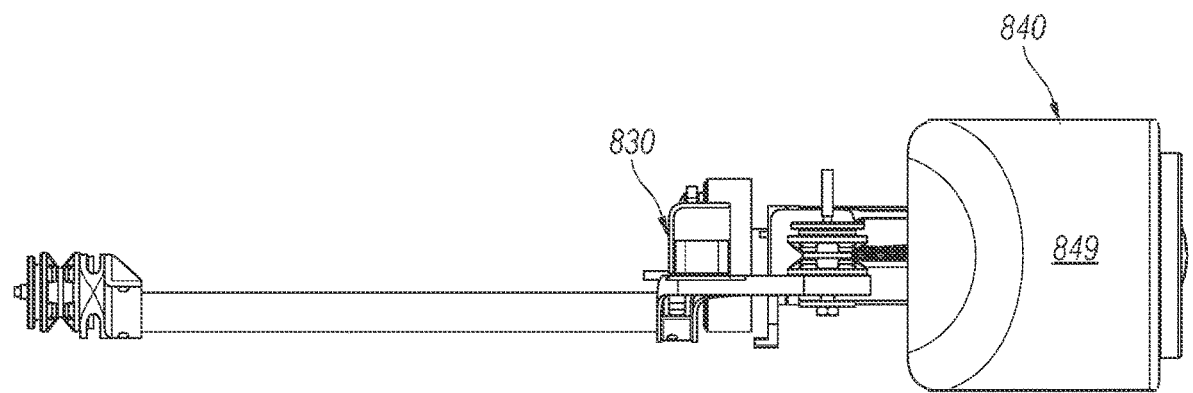
FIG. 12A shows a side view of the image capture assembly depicted in FIG. 11A with a housing cover.
Figure 12B:
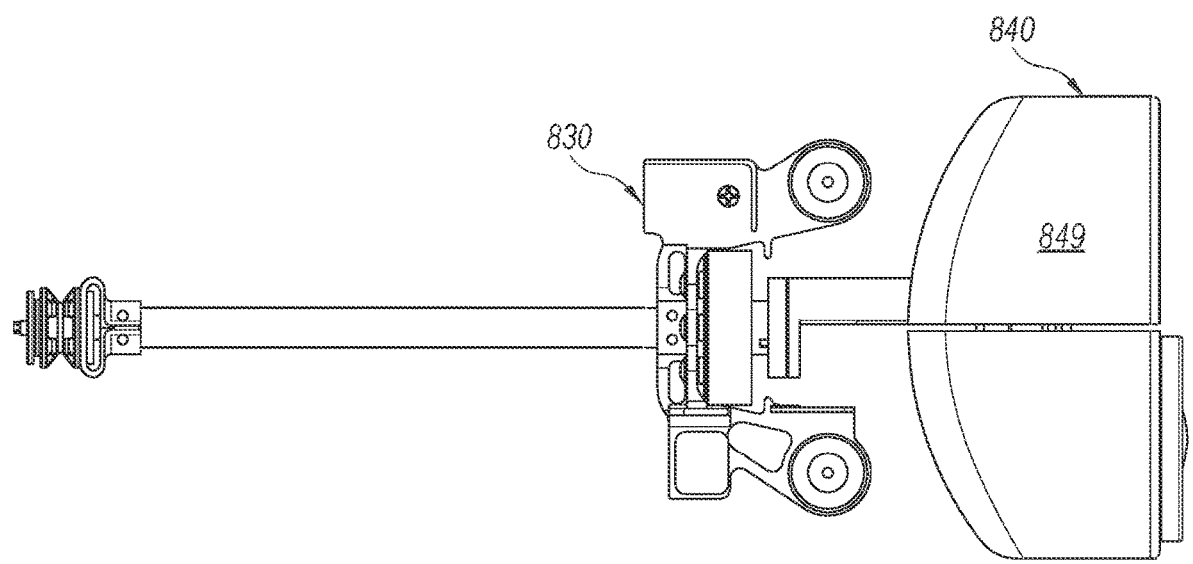
FIG. 12B shows a top view of the image capture assembly depicted in FIG. 11A with a housing cover.
Figure 12C:
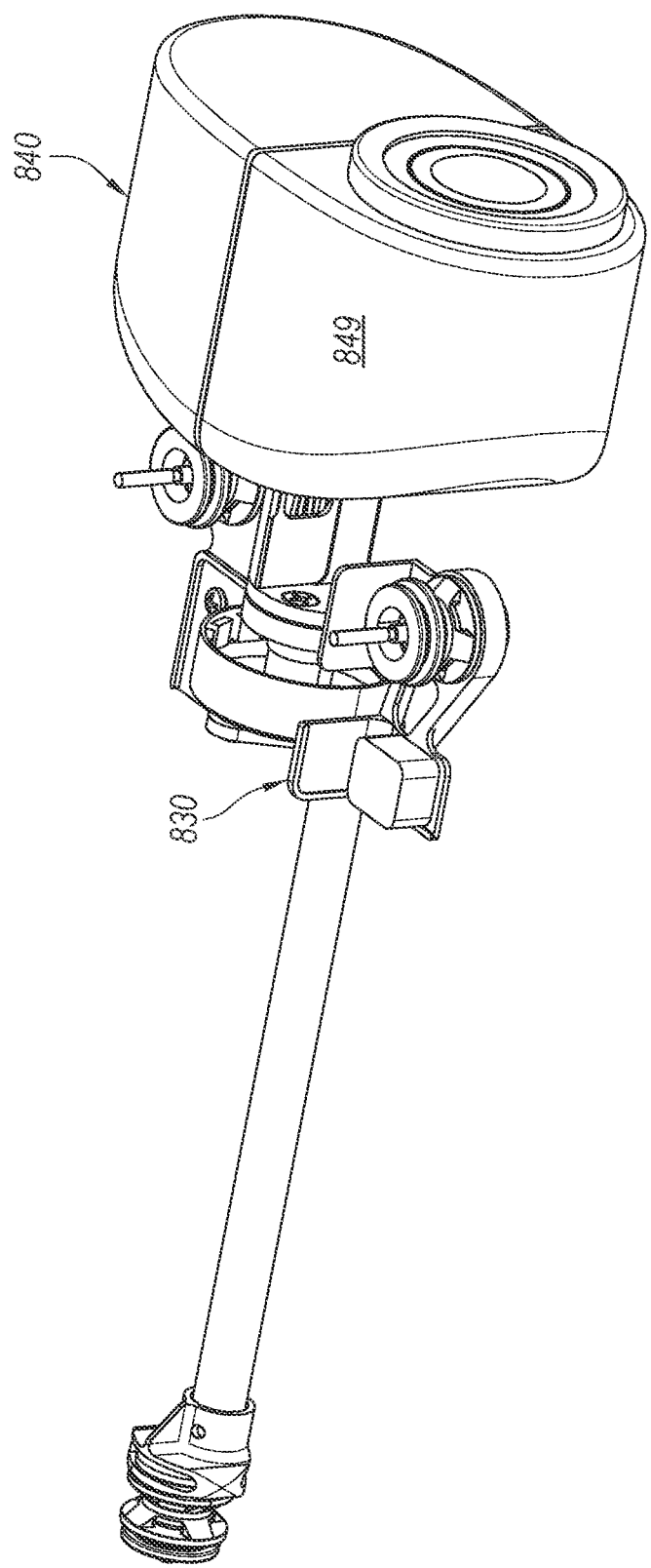
FIG. 12C shows an isometric view of the image capture assembly depicted in FIG. 11A with a housing cover.
Figure 12E:
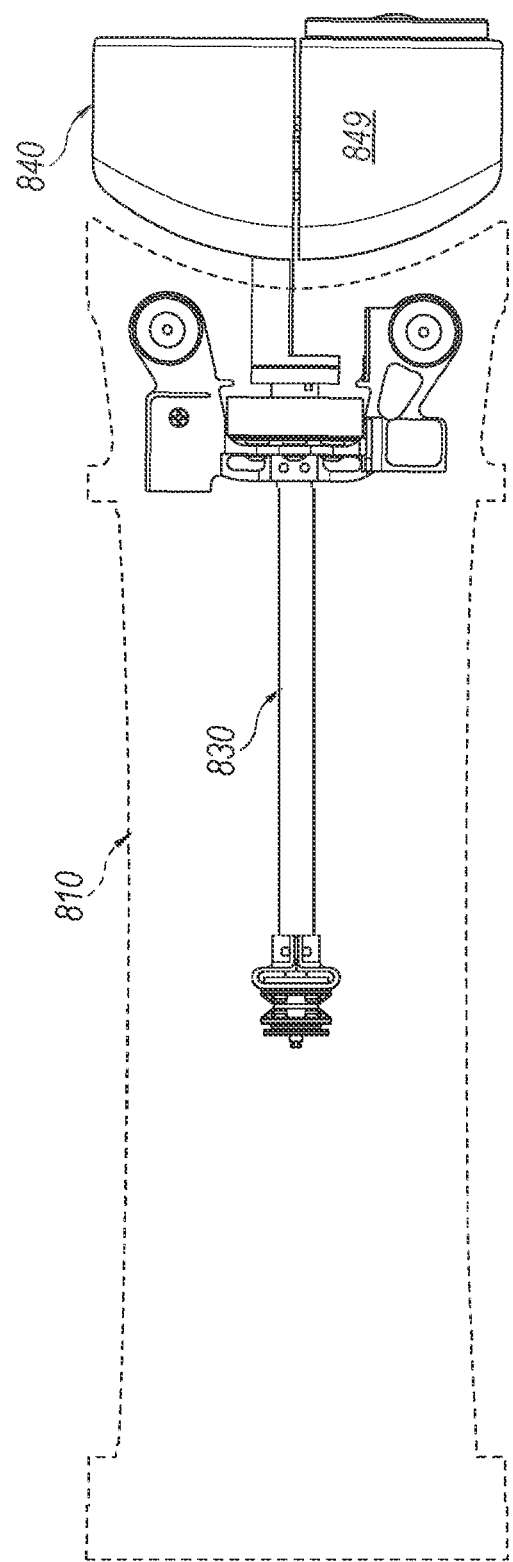
FIG. 12E shows a top view of the image capture assembly depicted in FIG. 11A, with a housing cover, and in the context of the housing of the UAV depicted in FIG. 8A.

In some embodiments, image capture assembly 840 includes a housing that surrounds and protects the active components (e.g., motors 842, 844, and image capture device 848). FIGS. 12A-12E show a series of views of the image capture assembly 840 described with respect to FIGS. 11A-11F but including a protective housing 849. Specifically, FIG. 12A shows a side view, FIG. 12B shows a top view, FIG. 12C shows an isometric view, FIG. 12D shows a side view in the context of UAV housing 810, and FIG. 12E shows a top view in the context of UAV housing 810. As with housing 810, housing 849 may comprise one or more structural components made of any material or combination of materials that that have strength and weight characteristics suitable for use in an aircraft. For example, housing 849 can be made of plastic, metal (e.g., aluminum), carbon fiber, synthetic fiber (e.g., Kevlar®), or some sort of composite material such as carbon or glass fiber embedded in an epoxy resin. Specifically, in example UAV 800, the housing 849 may be made of a plurality of plastic structural components formed through an injection molding and/or 3-D printing process. The plurality of components can be assembled and fastened to each other using any of integrated clips, screws, bolts, glue, welding, soldering, etc.

In some embodiments system components associated with the operation of UAV 800 may be mounted to dynamic portions of the vehicle (e.g., image capture assembly 840) to better balance the dynamic portions. For example, FIG. 13 shows a detail of the image capture assembly 840 (with housing 849 removed) showing certain components (e.g., a computing board) 841 mounted to the assembly. In general, such components are likely to be mounted to "static" portions of UAV 800 (e.g., housing 810). However, mounting such components 841 to a dynamic portion (e.g., image capture assembly 840) may in some cases help to balance the overall stabilization system. For example, recall that the elongated arm 832 of passive stabilization assembly 830 servers as a counter weight to any mounted device or assembly (e.g., image capture assembly 840). Depending on the design constraints in a specific embodiment, it may be beneficial to mount additional system components 841 to the counterbalanced device or assembly (image capture assembly 840). Further, in some embodiments components 841 may not even be associated with the stabilization systems of assembly 840. For example, it is contemplated that in some embodiments, components 841 may include components (e.g., processing units, sensors, memory units, communication devices) associated with autonomous localization and navigation system (described in more detail later).

Example Active Image Stabilization Process

Figure 14:
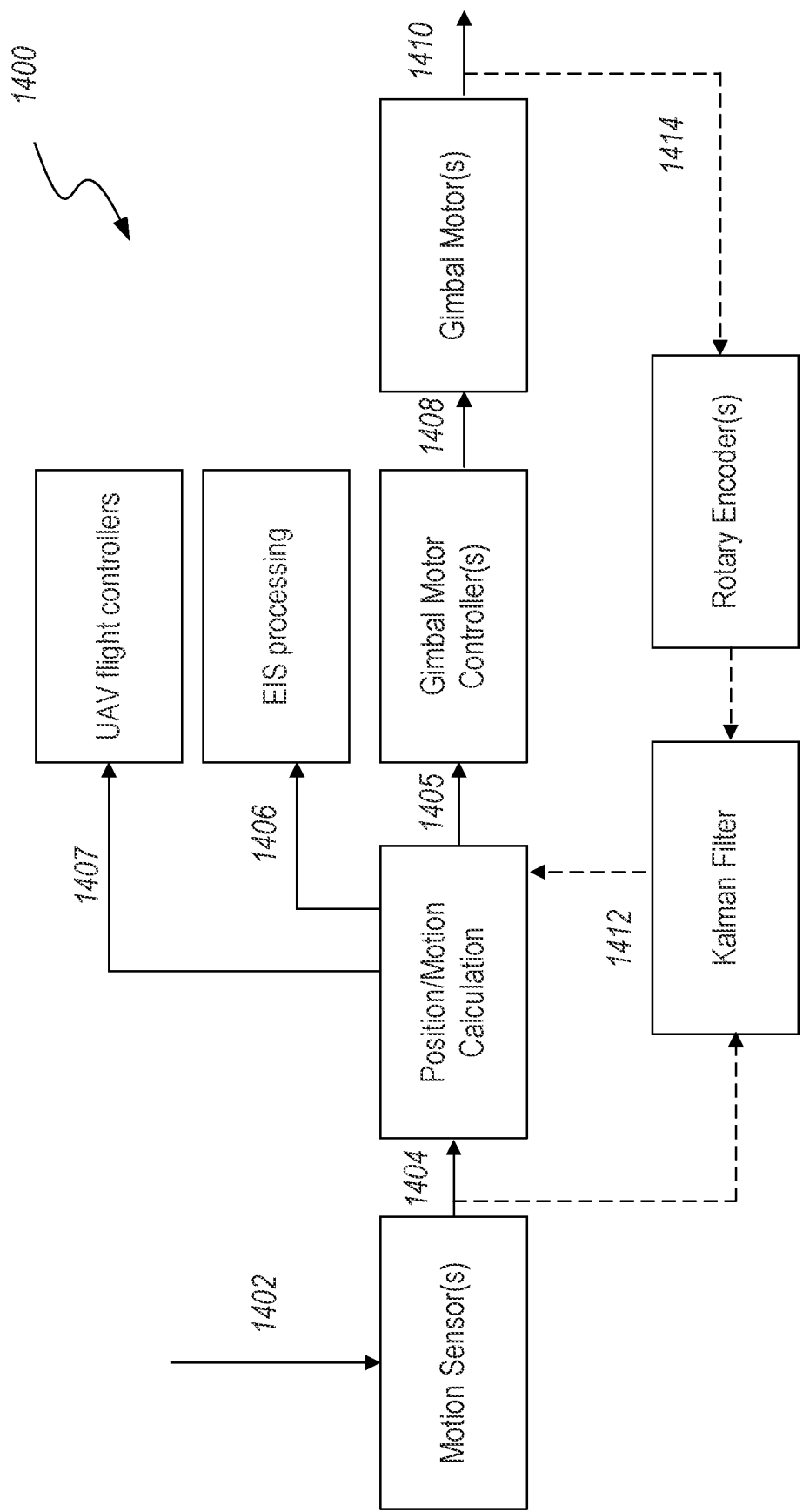
FIG. 14 is a flow diagram illustrating an example process for active image stabilization, according to some embodiments.

FIG. 14 is a flow diagram illustrating an example process 1400 for active image stabilization that may be performed by systems associated with example image capture assembly 840 in some embodiments. For illustrative clarity, certain process steps are described as being performed by components shown in FIG. 19. This is provided for illustrative purposes and is not to be construed as limiting certain process steps to certain components. As an example, process 1400 begins at step 1402 by detecting one or more motion sensors (e.g., accelerometers 1926 and/or IMU 1928), motion associated with UAV 800 with respect to one or more frames of reference. For example, motion may be detected by motion sensors (e.g., accelerometers) mounted at one or more of any of housing 810, passive image capture assembly 830, motors 842, 844, and image capture device 848. Motion in any of these frames of reference may further be estimated based on calculations performed by an autonomous localization and navigation system associated with UAV 810 (described in more detail later).

In response to the detected motion, at step 1404 sensor data is output by the one or more motion sensors and relative positions/motion are calculated based on the sensor data. Note in some embodiments, the one or more sensors may output at step 1404 raw sensor data that is then processed by a separate processing component (e.g., processors 1912) to make position/motion calculations. In some embodiments, the sensors themselves may process raw sensor data and output motion/positional data that is based on the raw sensor data.

In response to calculating motions/positions, at step 1405, control commands/signals may be generated (based on the calculated motions/positions) that are configured to cause the one or more motors (e.g., motor(s) 842, 844) to actuate one or more rotation joints so as to stabilize a mounted image capture device (e.g., device 848) relative to a particular frame of reference (e.g., the surface of the Earth). In some embodiments, generation of control commands and/or signals may be performed by one or more controller devices or other processing units (e.g., gimbal motor controllers 1907 and/or processors 1912). For example, in one embodiment, one or more processor(s) 1912 may generate control commands based on the calculated motion/position that are configured to be read by a separate gimbal motor controller 1907. The gimbal motor controller 1908 may interpret the control commands and based on those control commands generate control signals that cause the motor(s) 842, 844 to actuate. For example, control signals in this context may simply include applied voltage to induce electrical current within the stator coils of a brushless motor.

As previously mentioned, in some embodiments active image stabilization may include electronic image stabilization (EIS). Accordingly, in response to calculating motions/positions, images captured via image capture device 848 may at step 1406 be digitally stabilized to counter the detected motion by applying an EIS process. This EIS processing of the digital images may be performed in real time or near real time as the images are captured and/or in post processing.

Also as previously mentioned, in some embodiments, the UAV 800 may autonomously maneuver to stabilize capture by an image capture device 848. Accordingly, in response to calculating motions/positions, systems associated with an localization and automated navigation system (described in more detail later) may at step 1407 generate commands configured to cause the UAV 800 to execute flight maneuvers to counter certain detected motion.

Returning to the motorized gimbal, at step 1408 the control commands and/or control signals are output to the motor(s) (e.g., motor(s) 842, 844) to at step 1410 cause the motors to actuate one or more rotation joints and thereby stabilize a mounted device (e.g., image capture device 848) relative to a particular frame of reference (e.g., the surface of the Earth). As previously mentioned, in some embodiments the motor(s) may include integrated motor controller (s) (e.g., gimbal motor controllers 1907) and therefore may be configured to receive digital control commands generated by a separate processing unit (e.g., processor 1912). In some embodiments, control signals in the form of applied voltage may be an output to induce electrical current within the stator coils of the motor(s).

Optionally, at step 1412, raw and/or processed sensor data may be run through a non-linear estimator process (e.g., an extended Kalman filter) to produce more accurate position/ motion estimations and reduce jitter or shakiness in the resulting active stabilization processes (e.g., using motors, EIS, etc.). For example, calculated relative position/motion (e.g., by an IMU) can be based on a process commonly referred to as "dead reckoning." In other words, a current position can be continuously estimated based on previously estimated positions, measured velocity, and elapsed time. While effective to an extent, the accuracy achieved through dead reckoning based on measurements from an IMU can quickly degrade due to the cumulative effect of errors in each predicted current position. Errors are further compounded by the fact that each predicted position is based on an calculated integral of the measured velocity. To counter such effects, a nonlinear estimation algorithm (one embodiment being an "extended Kalman filter") may be applied to a series of measured positions and/or orientations to produce a real-time optimized prediction of the current position/ motion based on assumed uncertainties in the observed data. Non-liner estimation processed such as Kalman filters are commonly applied in a number of control systems with feedback loops.

Also optionally, at step 1414, in some embodiments, the position motion of the motors(s) (i.e., angular position motion of the rotor axle(s)) may be measured by one or more rotary encoders and this information may be fed back into the process 1406 of generating control commands/signals. In some embodiments, as with the sensor data from the motion sensor(s), a non-linear estimation process (e.g., Kalman filter) may be applied at step 1412 to the positional information output by the rotary encoders before being used to generate the control commands/signals.

Note that the previously mentioned active systems have been described in the context of stabilizing image capture to counter detected motion. A person having ordinary skill will recognize that similar systems (e.g., motorize gimbal and/or digital image processing) can be applied to respond (directly or indirectly) to user control inputs. For example, gimbal motor controllers 1907 associated with a motorized gimbal mechanism 1954 may be configured to receive control commands based on inputs provided by a user such as a remote pilot of UAV 800 or an onboard pilot in a manned vehicle. Similarly, these systems can be applied as part of an automated subject tracking system. For example, motor controllers associated with a motorized gimbal mechanism may be configured to receive control commands from a localization and navigation system associated with UAV 800 to automatically track a particular point in space or a detected physical object in the surrounding environment.

Localization and Automated Navigation

Figure 15:
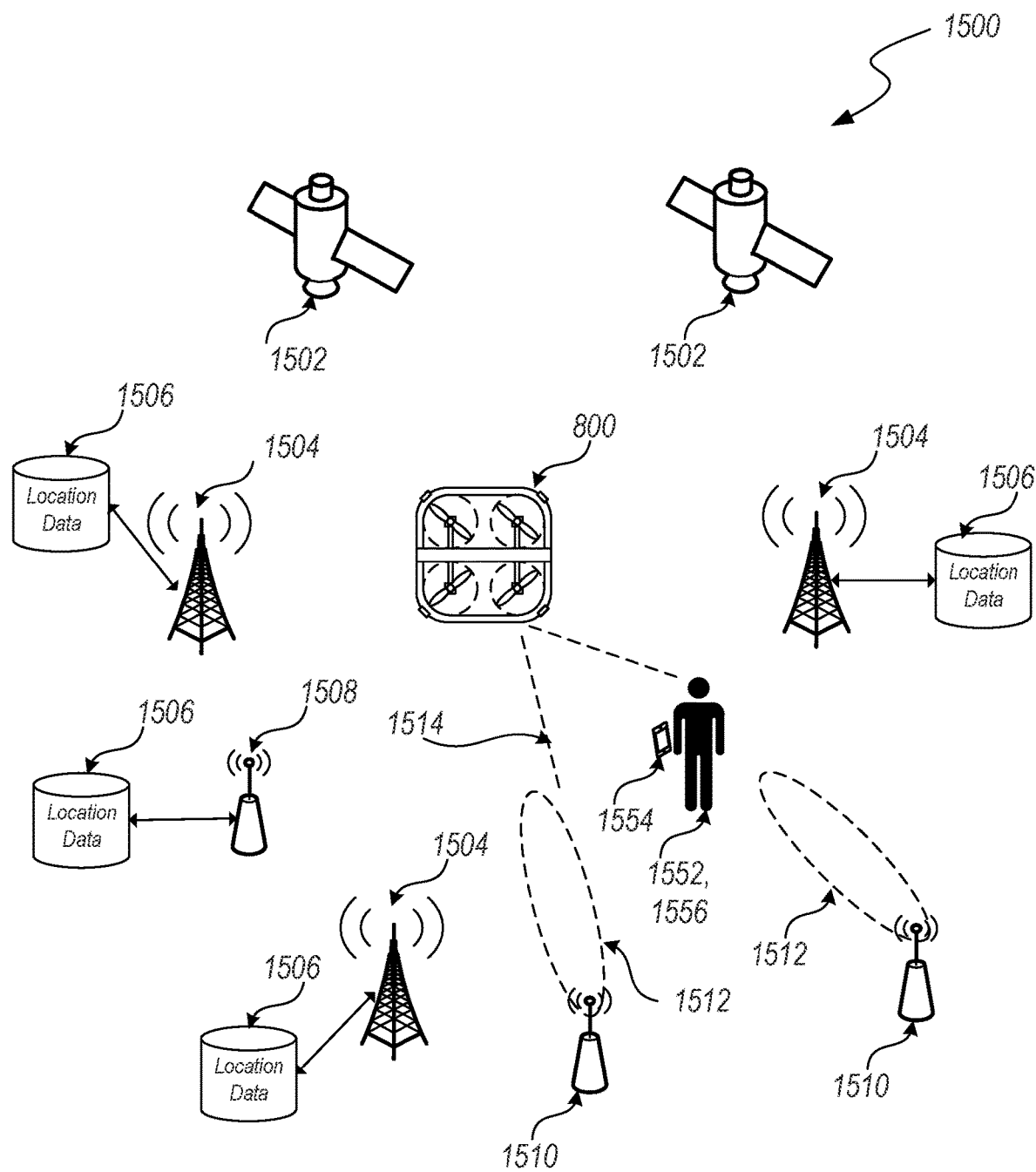
FIG. 15 shows a conceptual diagram of a localization and navigation system for guiding navigation and image/video capture by a UAV.

FIG. 15 is a high-level illustration of a localization and navigation system 1500, according to some embodiments, for guiding navigation and image/video capture by a UAV, for example UAV 800. The systems and methods for automated localization and navigation are described herein in the context of example UAV 800 for clarity and illustrative purposes. However, it shall be noted that UAV 800 may include fewer or more autonomous navigation capabilities than as described. For example, in some embodiments UAV 800 may not include any of the autonomous navigation capabilities described herein. According to some embodiments, a relative position and/or orientation of the UAV 800, one or more subjects 1556, and/or one or more other physical objects in the environment surrounding UAV 800 may be determined using one or more of the subsystems illustrated in FIG. 15. Further, this relative position and/or orientation data may be used by the UAV 800 to autonomously navigate and to track subjects for image capture. The present teaching localization system 1500 may include an UAV 800, a GPS system comprising multiple GPS satellites 1502, a cellular system comprising multiple cellular antennae 1504 (with access to sources of localization data 1506), a Wi-Fi system comprising multiple Wi-Fi routers 1508 (with access to sources of localization data 1506), and a portable multifunction device (PMD) 1554 operated by a user 1552. Note, in FIG. 15 the user 1552 is also the subject 1556 for image capture, however the subject 1556 can also be any other real or virtual object or can be an defined point in space.

In some embodiments, PMD 1554 may include mobile, hand held or otherwise portable computing devices that may be any of, but not limited to, a notebook, a laptop computer, a handheld computer, a palmtop computer, a mobile phone, a cell phone, a PDA, a smart phone (e.g., iPhone®, etc.), a tablet (e.g., iPad®, etc.), a phablet (e.g., HTC Droid DNA™, etc.), a tablet PC, a thin-client, a hand held console, a hand-held gaming device or console (e.g., XBOX®, etc.), mobile-enabled powered watch (e.g., iOS, Android or other platform based), a smart glass device (e.g., Google Glass™, etc.) and/or any other portable, mobile, hand held devices, etc. running on any platform or any operating system (e.g., OS X, iOS, Windows Mobile, Android, Blackberry OS, Embedded Linux platforms, Palm OS, Symbian platform, Google Chrome OS, etc.). A PMD 1554 may also be a simple electronic device comprising minimal components. For example, a PMD may simply include sensors for detecting motion and/or orientation and a transmitter/receiver means for transmitting and/or receiving data.

As mentioned earlier, a relative position and/or orientation of the UAV 800, a relative position and/or orientation of the subject 1556, and/or a relative position and/or orientation of a PMD 1554 operated by a user 1552 may be determined using one or more of the subsystems illustrated in FIG. 15. For example, using only the GPS system 1502, a position on the globe may be determined for any device comprising a GPS receiver (e.g., the UAV 800 and/or the PMD 1554). While GPS by itself in certain implementations may provide highly accurate global positioning it is generally not capable of providing accurate information regarding orientation. Instead a technique of multiple inputs and multiple outputs ("MIMO") (as illustrated in FIG. 15) may be used for localization, potentially in conjunction with other localization subsystems.

Consider the example based on the illustration in FIG. 15; a user 1552 is utilizing an autonomous UAV 800 via a PMD 1554 to film herself overhead. In order to navigate the UAV 800 and inform the tracking by an image capture device (e.g., image capture device 848) of the subject 1556 (in this case the user 1552), a relative position and orientation of the UAV 800 relative to the PMD 1554 (or any other point of reference) may be necessary. This relative position between the UAV 800 and the PMD 1554 may be determined using a GPS system to compare a global position of the UAV 800 and a global position of the PMD 1554.

Similarly, using an array of cellular and or/Wi-Fi antennae, a position relative to the known locations of antennae may be determined for both the UAV 800 and PMD 1554 using known positioning techniques. Some known positioning techniques include those based on signal trilateration, for example round trip time of arrival (RTT) in which a signal is sent and received by a signal transceiver and distance is calculated based on the elapsed time, received signal strength (RSS) in which the power levels of the transmitted signal and the received signals are analyzed and a distance determined based on a known propagation loss. Other known positioning techniques include those based on signal triangulation, for example angle of arrival (AoA) in which angles of arriving signals are determined and through applied geometry a position is determined. Current Wi-Fi standards, such as 803.11n and 802.11ac, allow for radio frequency (RF) signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 15 by dotted lines 1512 emanating from Wi-Fi routers 1510.

Figure 16:
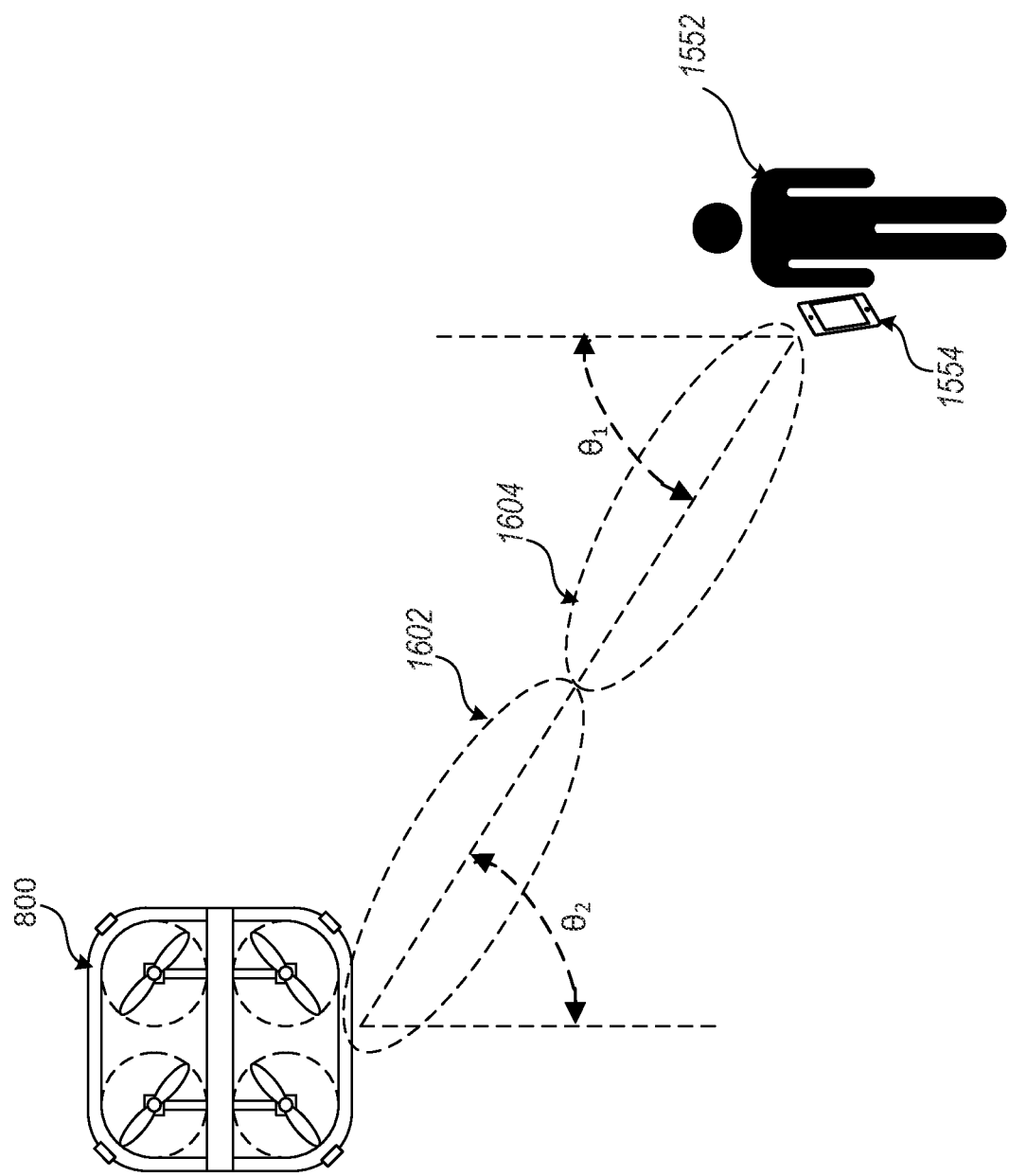
FIG. 16 shows a conceptual diagram of a system for estimating the position and/or orientation of a UAV using a network of phased array wireless transceivers.

As illustrated in FIG. 16, a UAV 800 and/or PMD 1554 may include a phased array of Wi-Fi antenna and a relative position and/or pose may be calculated without the necessity for external existing Wi-Fi routers. According to some embodiments, the UAV 800 and/or PMD 1554 may transmit and/or receive a beamformed RF signal via a phased antenna array. The UAV 800 and/or PMD 1554 may then detect the phase differences and power levels of the respective incoming signals and calculate an AoA for the incoming signals. For example, according to FIG. 16, the PMD 1554 may determine an AoA of $\theta_1$ for the RF signals 1602 transmitted by the UAV 800. Similarly, the UAV 800 may determine an AoA of $\theta_2$ for the RF signals 1604 transmitted by the PMD 1554. This AoA information may then be incorporated with information gathered by an IMU on the UAV 100 and/or PMD 104 (as well as other positioning data as described earlier) in order to infer a relative position and/pose between the UAV 800 and the PMD 1554.

Figure 17:
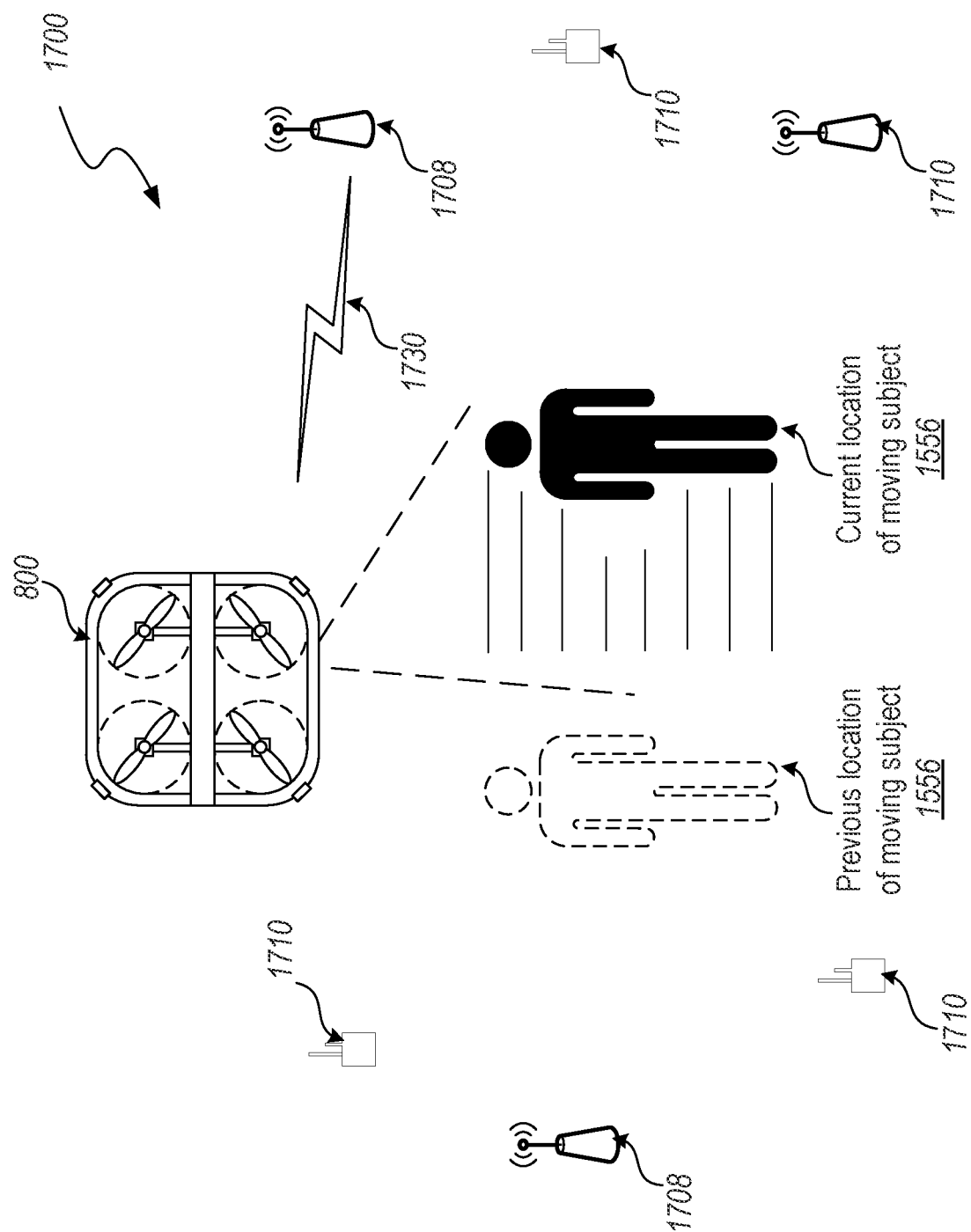
FIG. 17 shows a conceptual diagram of an example system for passive localization of an object tracked by a UAV.

According to some embodiments, an array of Wi-Fi transmitters and signal monitors may be utilized for device-free passive localization of objects that are not transmitting signals (e.g., a human subject 1556 not carrying a PMD 1554). FIG. 17 illustrates an example system 1700 for device-free passive localization of a subject (e.g., a human subject 1556). In this example a human subject 1556 passes through a network of Wi-Fi transmitters 1708 transmitting RF signals. The signal monitors 1710 (e.g., standard wireless sniffers) may detect changes in the characteristics of the RF signals received from the Wi-Fi transmitters 1708 caused by interference as the human subject 1556 passes through the signal field. Using localization algorithms, such changes in the RF signal field may be correlated to the presence of an object, its type, its orientation and its location. Also, according to FIG. 17, information gathered by device-free passive localization system 1700 may be fed wirelessly (e.g., via Wi-Fi connection 1730) to a nearby UAV 800 in order to inform its tracking of the human subject 1556.

According to some embodiments, an inertial measurement unit (IMU) may be used to determine relative position and/or orientation. An IMU is a device that calculates a vehicle's velocity, orientation, and gravitational forces using a combination of accelerometers and gyroscopes. As described herein, an UAV 800 and/or PMD 1554 may include one or more IMUs. Using a method commonly referred to as "dead reckoning" an IMU (or associated systems) may be used to calculate and track a predicted position based on a previously known position(s) using measured velocities and the time elapsed from the previously known position(s). While effective to an extent, the accuracy achieved through dead reckoning based on measurements from an IMU quickly degrades due to the cumulative effect of errors in each predicted current position. Errors are further compounded by the fact that each predicted position is based on an calculated integral of the measured velocity. To counter such effects, an embodiment utilizing localization using an IMU may include localization data from other sources (e.g., the GPS, Wi-Fi, and cellular systems described above) to continuously update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

According to some embodiments, computer vision may be used to determine a relative position and/or orientation of a UAV 800 or any other object. The term, "computer vision" in this context may generally refer to the acquiring, processing, analyzing and understanding of captured images. Consider again the localization system 1500 illustrated in FIG. 15. According to some embodiments, UAV 800 may include image capture devices and computer vision capabilities. In this example, UAV 100 may be programed to track a subject (e.g., a human or some other object). Using computer vision, UAV 800 may recognize the subject in images captured by the image capture devices and may use the recognition information to perform aerial maneuvers to keep the subject in view, and/or may make adjustments in image capture (e.g., using a gimbaled image capture device) to keep the subject in view.

Relative position and/or orientation may be determined through computer vision using a number of methods. According to some embodiments an image capture device of the UAV 800 may include two or more cameras. By comparing the captured image from two or more vantage points, a system employing computer vision may calculate a distance to a captured physical object. With the calculated distance as well as other position and/or orientation data for the UAV (e.g., data from GPS, Wi-Fi, Cellular, and/or IMU, as discussed above) a relative position and/or orientation may be determined between the UAV 800 and a point of reference (e.g., the captured physical object).

According to some embodiments, an image capture device of UAV 800 may be a single camera (i.e., a non-stereoscopic camera). Here, computer vision algorithms may identify the presence of an object and identify the object as belonging to a known type with particular dimensions. For example, through computer vision, the object may be identified as an adult male human. With this recognition data, as well as other position and/or orientation data for the UAV 100 (e.g., data from GPS, Wi-Fi, Cellular, and/or IMU, as discussed above), UAV 100 may predict a relative position and/or orientation of the object.

Figure 18A:
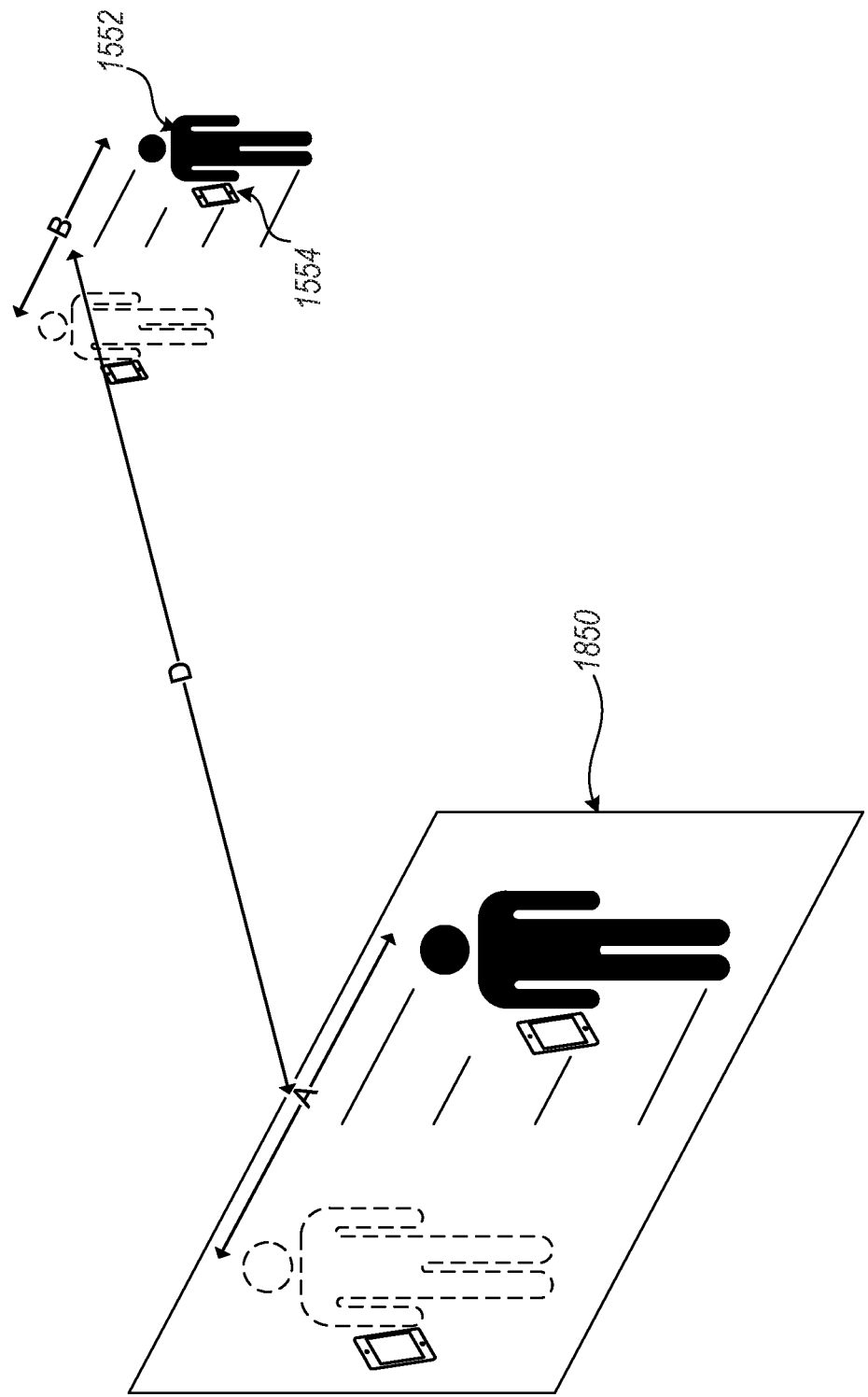
FIG. 18A-18B illustrate example methods for estimating the position and/or orientation of objects using computer vision technology.
Figure 18B:
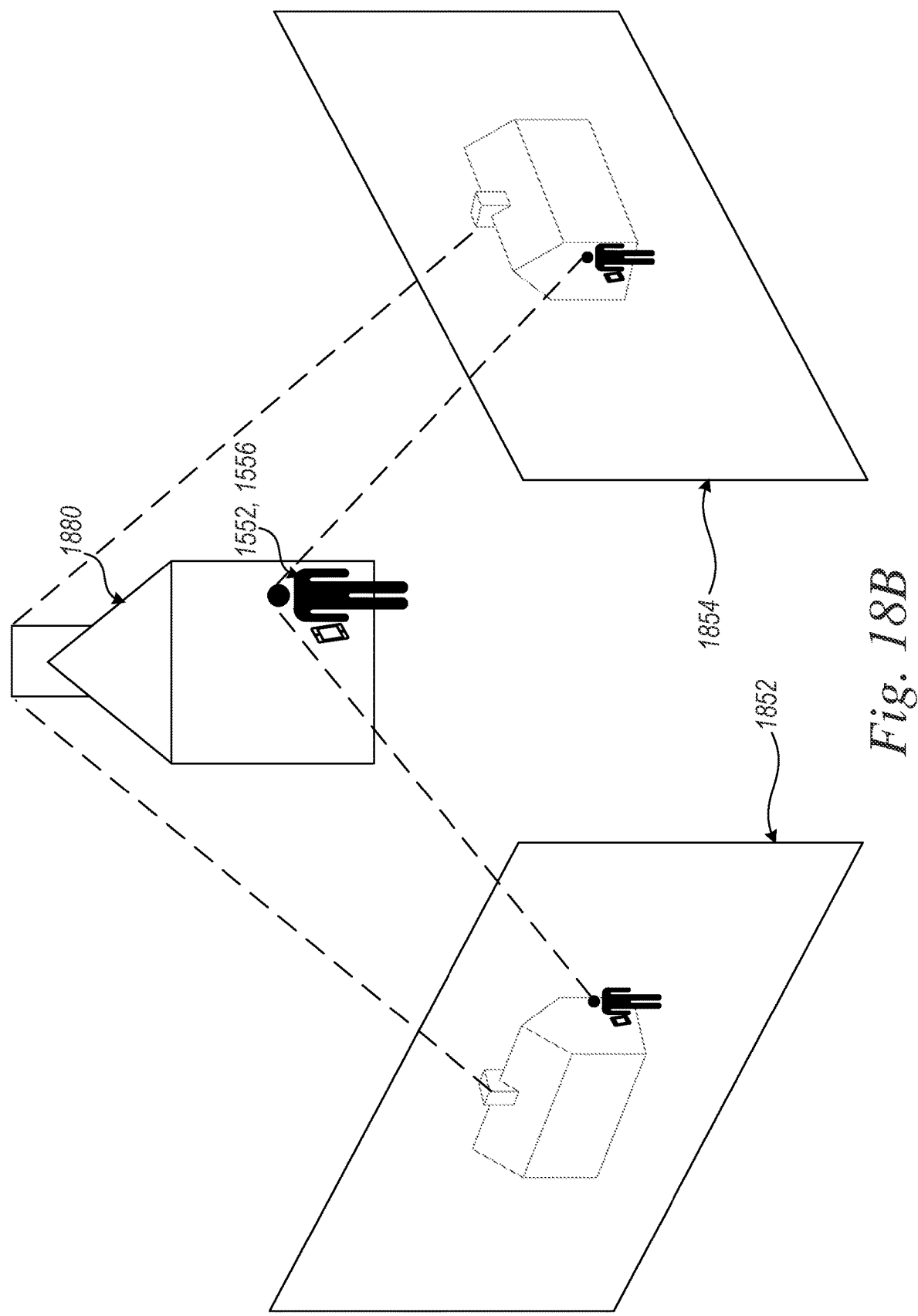

According to some embodiments, computer vision may be used along with measurements from an IMU (or accelerometer(s) or gyroscope(s)) within the UAV and/or PMD 1554 carried by a user 1552 as illustrated in FIG. 18A-18B. FIG. 18A shows a simple diagram that illustrates how sensor data gathered by an IMU at a PMD 15544 may be applied to sensor data gathered by an image capture device at an UAV 800 to determine position and/or orientation data of a physical object (e.g., a user 1552). Outline 1850 represents a 2-dimensional image captured field of view at UAV 800. As shown in FIG. 18A, the field of view 1850 includes the image of a physical object (e.g., user 1552) moving from one position to another. From its vantage point, UAV 800 may determine a distance A traveled across the image capture field of view 1850. The PMD 1554, carried by user 1552, may determine an actual distance B traveled by the user 1552 based on measurements by internal sensors (e.g., the IMU) and an elapsed time. The UAV 800 may then receive the sensor data and/or the distance B calculation from PMD 1554 (e.g., via wireless RF signal). Correlating the difference between the observed distance A and the received distance B, UAV 800 may determine a distance D between UAV 800 and the physical object (e.g., user 1552). With the calculated distance as well as other position and/or orientation data for the UAV 800 (e.g., data from GPS, Wi-Fi, Cellular, and/or IMU, as discussed above) a relative position and/or orientation may be determined between the UAV 800 and the physical object (e.g., user 1552).

Alternatively, estimations for the position and/or orientation of either the UAV 800 or PMD 1554 may be made using a process generally referred to as "visual inertial odometry" or "visual odometry." FIG. 18B illustrates the working concept behind visual odometry at a high level. A plurality of images is captured in sequence as a camera moves through space. Due to the movement of the camera, the images captured of the surrounding space change from frame to frame. In FIG. 18B, this is illustrated by initial image capture field of view 1852 and a subsequent image capture field of view 1854 captured as the image capture device has moved from a first position and orientation to a second position and orientation over an elapsed time. In both images, the image capture device may capture real world physical objects, for example, the house 1880 and/or a human subject 1556 (e.g., user 1552). Computer vision techniques are applied to the sequence of images to detect and match features of physical objects captured in the field of view of the camera. For example, in FIG. 18B, features such as the head of a human subject or the corner of the chimney on the house 1880 are identified, matched, and thereby tracked. By incorporating sensor data from an IMU (or accelerometer(s) or gyroscope(s)) associated with the camera to the tracked features of the image capture, estimations may be made for the position and/or orientation of the camera over time. This technique may be applied at both the UAV 800 and PMD 15544 to calculate the position and/or orientation of both systems. Further, by communicating the estimates between the systems (e.g., via a Wi-Fi connection) estimates may be calculated for the respective positions and/or orientations relative to each other. As previously mentioned position, orientation, and motion estimation based in part on sensor data from an on board IMU may introduce error propagation issues. As previously stated, optimization techniques may be applied to position, orientation, and motion estimations to counter such uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data.

According to some embodiments, computer vision may include remote sensing technologies such as laser illuminated detection and ranging (LIDAR or Lidar). For example, an UAV 800 equipped with LIDAR may emit one or more laser beams in a continuous scan up to 360 degrees in all directions around the UAV 800. Light received by the UAV 800 as the laser beams reflect off physical objects in the surrounding physical world may be analyzed to construct a real time 3D computer model of the surrounding physical world. Such 3D models may be analyzed to identify particular physical objects (e.g., a user 1552) in the physical world for tracking. Further, images captured by an image capture device may be combined with the laser constructed 3D models to form textured 3D models that may be further analyzed in real time or near real time for physical object recognition (e.g., by using computer vision algorithms).

The computer vision-aided localization and navigation system described above may calculate the position and/or orientation of features in the physical world in addition to the position and/or orientation of the UAV 800 and/or PMD 1554. The position of these features may then be fed into the navigation system such that motion trajectories may be planned that avoid obstacles. In addition, in some embodiments, the visual navigation algorithms may incorporate data from proximity sensors (e.g., electromagnetic, acoustic, and/or optics based) to estimate obstacle position with more accuracy. Further refinement may be possible with the use of stereoscopic computer vision with multiple cameras, as described earlier.

According to some embodiments, the previously described relative position and/or orientation calculations may be performed by an UAV 800, PMD 1554, remote computing device(s) (not shown in the figures), or any combination thereof.

The localization system 1500 of FIG. 15 (including all of the associated subsystems as previously described) is only one example of a system for localization and navigation. Localization system 1500 may have more or fewer components than shown, may combine two or more components, or a may have a different configuration or arrangement of the components. Some of the various components shown in FIGS. 15 through 18B may be implemented in hardware, software, or a combination of both hardware and software, including one or more signal processing and/or application specific integrated circuits.

Unmanned Aerial Vehicle—System Components

An Unmanned Aerial Vehicle (UAV), sometimes referred to as a drone, is generally defined as any aircraft capable of controlled flight without a human pilot onboard. UAVs may be controlled autonomously by onboard computer processors and/or via remote control by a remotely located human pilot. Similar to an airplane, UAVs may utilize fixed aerodynamic surfaces along means for propulsion (e.g., propeller, rotor, jet. etc.) to achieve lift. Alternatively, similar to helicopters, a UAV may directly use means for propulsion (e.g., propeller, rotor, jet. etc.) to counter gravitational forces and achieve lift. Propulsion-driven lift (as in the case of helicopters) offers significant advantages in certain implementations, for example as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, the first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on horizontal plane.

Figure 19:
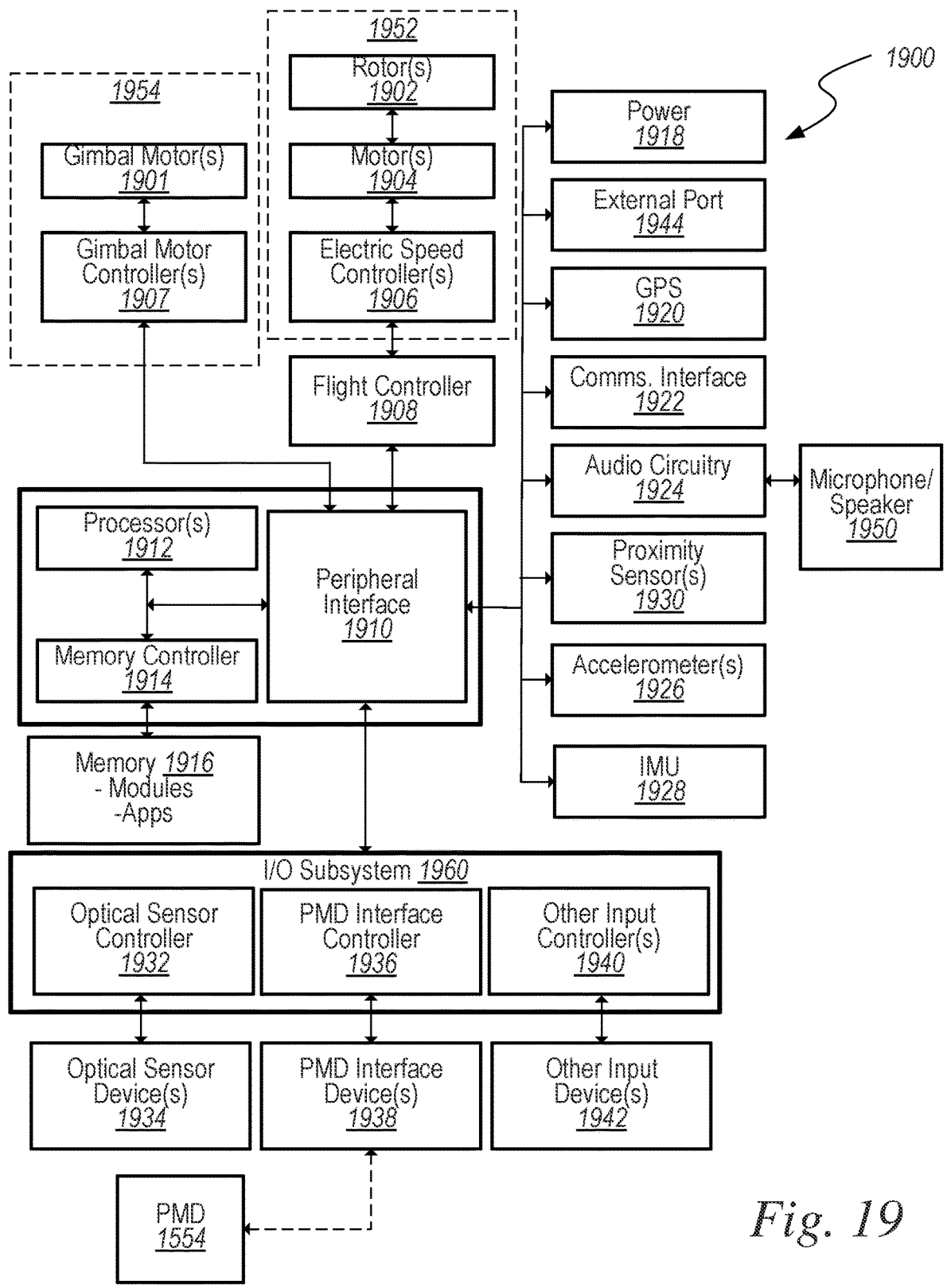
FIG. 19 shows a high level system diagram of components in an example UAV.

FIG. 19 is a high-level diagram illustrating a system 1900 of components of example UAV 800, according to some embodiments. UAV system 1900 may include several subsystems. For example, UAV system 1900 may include one or more propulsion systems 1952. As shown in FIG. 19, in an embodiment, propulsion system 1952 includes one or more means for propulsion (e.g., rotors 1902 and motor(s) 1904) and one or more electronic speed controllers 1906 configured to regulate power to the means of propulsion. UAV system 1900 may also include a motorized gimbal system 1954 that includes gimbal motor controllers 1907 and gimbal motors 1901 (e.g., similar to previously described motors 842 and 844). UAV system 1900 may also include a flight controller 1908, a peripheral interface 1910, a processor(s) 1912, a memory controller 1914, a memory 1916 (which may include one or more computer readable storage mediums), a power module 1918, a GPS module 1920, a communications interface 1922, an audio circuitry 1924, an accelerometer 1926 (including subcomponents such as gyroscopes), an inertial measurement unit (IMU) 1928, a proximity sensor 1930, an optical sensor controller 1932 and associated optical sensor(s) 1934, a portable multifunction device (PMD) interface controller 1936 with associated interface device(s) 1938, and any other input controllers 1940 and input device 1942, for example display controllers with associated display device(s). General terms such as "sensors" may refer to one or more components or combinations of components, for example, microphone 1924, proximity sensors 1930, accelerometers 1926, an inertial measurement unit (IMU) 1928, optical sensors 1934, and any combination thereof. These components may communicate over one or more communication buses, interconnects, wires, or signal lines as represented by the arrows in FIG. 19.

UAV system 1900 is only one example of a system for use in UAV 800. UAV system 1900 may have more or fewer components than shown, may combine two or more components as functional units, or a may have a different configuration or arrangement of the components. Some of the various components shown in FIG. 19 may be implemented in hardware, software, or a combination of both hardware and software, including one or more signal processing and/or application specific integrated circuits.

As described earlier, the propulsion system 1952 may include a fixed-pitch rotor. The propulsion system 1952 may also include a variable-pitch rotor (for example, using a gimbal mechanism), a variable-pitch jet engine, or any other mode of propulsion having the effect of providing force. The means for propulsion system 1952 may include a means for varying the applied thrust, for example via an electronic speed controller 1906 varying the speed of each fixed-pitch rotor.

Flight Controller 1908 (sometimes referred to as a "flight control system" or "autopilot") may include a combination of hardware and/or software configured to receive input data (e.g., input control commands from PMD 1554 and or sensor data from an accelerometer 1926 or 1928), interpret the data and output control signals to the propulsion system 1952 and/or aerodynamic surfaces (e.g., fixed wing control surfaces) of the UAV 800. Alternatively, or in addition, a flight controller 1908 may be configured to receive control commands generated by another component or device (e.g., processors 1912 and/or a separate remote computing device), interpret those control commands and generate control signals to propulsion system 1952. In some embodiments, a flight controller 1908 may be integrated with propulsion system 1952 as a single modular unit configured to receive control commands from a separate processing unit 1912.

Motorized gimbal mechanism 1954 may be part of an image capture assembly 840, as described previously. The gimbal motor controller(s) 1907 of system 1954 may include a combination of hardware and/or software configured to receive input sensor data (e.g., from an accelerometer 1926 or IMU 1928), interpret the data and output control signals to the motor(s) 604 of the motorized gimbal 100. Alternatively, or in addition, a gimbal motor controller 1907 may be configured to receive control commands generated by another component or device (e.g., processors 1912 and/or a separate remote computing device), interpret those control commands and generate control signals to the gimbal motor(s) 1901 of the motorized gimbal mechanism 1954. In some embodiments, a gimbal motor controller 1907 may be integrated with a gimbal motor 1901 as a single modular unit configured to receive control commands from a separate processing unit 1912.

Memory 1916 may include high-speed random-access memory and may also include non-volatile memory, such as one or more magnetic disk storage devices, flash memory devices, or other non-volatile solid-state memory devices. Access to memory 1916 by other components of UAV system 1900, such as the processors 1912 and the peripherals interface 1910, may be controlled by the memory controller 1914.

The peripherals interface 1910 may couple the input and output peripherals of the UAV 800 to the processor(s) 1912 and memory 1916. The one or more processors 1912 run or execute various software programs and/or sets of instructions stored in memory 1916 to perform various functions for the UAV 800 and to process data. In some embodiments, processors 1912 may include general central processing units (CPUs), specialized processing units such as Graphical Processing Units (GPUs) particularly suited to parallel processing applications, or any combination thereof.

In some embodiments, the peripherals interface 1910, the processor(s) 1912, and the memory controller 1914 may be implemented on a single integrated chip. In some other embodiments, they may be implemented on separate chips.

The network communications interface 1922 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11ac), voice over Internet Protocol (VoIP), Wi-MAX, or any other suitable communication protocol, including communication protocols not yet developed as of the filing date of this document.

The audio circuitry 1924, including the speaker and microphone 1950 may provide an audio interface between the surrounding environment and the UAV 800. The audio circuitry 1924 may receive audio data from the peripherals interface 1910, convert the audio data to an electrical signal, and transmits the electrical signal to the speaker 1950. The speaker 1950 may convert the electrical signal to human-audible sound waves. The audio circuitry 1924 may also receive electrical signals converted by the microphone 1950 from sound waves. The audio circuitry 1924 may convert the electrical signal to audio data and transmits the audio data to the peripherals interface 1910 for processing. Audio data may be retrieved from and/or transmitted to memory 1916 and/or the network communications interface 1922 by the peripherals interface 1910.

The I/O subsystem 1960 may couple input/output peripherals on the UAV 800, such as an optical sensor system 1934, the PMD interface device 1938, and other input/control devices 1942, to the peripherals interface 1910. The I/O subsystem 1960 may include an optical sensor controller 1932, a PMD interface controller 1936, and other input controller(s) 1940 for other input or control devices. The one or more input controllers 1940 receive/send electrical signals from/to other input or control devices 1942.

The other input/control devices 1942 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV system 1900 and a user. A display controller may receive and/or send electrical signals from/to the touch screen. The touch screen may display visual output to the user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1916) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

The PMD interface device 1938 along with PMD interface controller 1936 may facilitate the transmission of data between the UAV system 1900 and a PMD 1554. According to some embodiments, communications interface 1922 may facilitate the transmission of data between UAV 800 and a PMD 1554 (for example where data is transferred over a local Wi-Fi network).

The UAV system 1900 also includes a power system 1918 for powering the various components. The power system 1918 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in computerized device.

The UAV system 1900 may also include one or more optical sensors 1934. FIG. 19 shows an optical sensor coupled to an optical sensor controller 1932 in I/O subsystem 1960. The optical sensor 1934 may include a charge-coupled device (CCD) or complementary metal-oxide semiconductor (CMOS) phototransistors. The optical sensor 1934 receives light from the environment, projected through one or more lens (the combination of optical sensor and lens herein referred to as a "camera") and converts the light to data representing an image. In conjunction with an imaging module located in memory 1916, the optical sensor 1932 may capture still images and/or video. Optical sensors 1934 may be understood as the same or similar as image capture devices 884 described with respect to FIGS. 8A and 8D and gimbaled image capture device 848 described with respect to FIGS. 11A-11F.

The UAV system 1900 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and light illuminated detection and ranging (Lidar).

The UAV system 1900 may also include one or more accelerometers 1926. FIG. 19 shows an accelerometer 1926 coupled to the peripherals interface 1910. Alternately, the accelerometer 1926 may be coupled to an input controller 1940 in the I/O subsystem 1960.

The UAV system 1900 may include one or more inertial measurement units (IMU) 1928. An IMU 1928 may measure and report the UAV's velocity, acceleration, orientation, and gravitational forces using a combination of gyroscopes and accelerometers (e.g., accelerometer 1926). As previously mentioned, accelerometers 1926 and IMU 1928 may be mounted to different components of UAV 800. For example, accelerometers 1926 and/or IMU 1928 can be mounted to any of housing 810, passive stabilization assembly 830, motors 842, 844, or image capture device 848 to detect motion in different frames of reference.

The UAV system 1900 may include a global positioning system (GPS) receiver 1920. FIG. 19 shows an GPS receiver 1920 coupled to the peripherals interface 1310. Alternately, the GPS receiver 1920 may be coupled to an input controller 1940 in the I/O subsystem 1960. The GPS receiver 1320 may receive signals from GPS satellites in orbit around the earth, calculate a distance to each of the GPS satellites (through the use of GPS software), and thereby pinpoint a current global position of UAV 800. In some embodiments, positioning of UAV 800 may be accomplished without GPS satellites through the use of other techniques as described herein.

In some embodiments, the software components stored in memory 1916 may include an operating system, a communication module (or set of instructions), a flight control module (or set of instructions), a localization module (or set of instructions), a computer vision module, a graphics module (or set of instructions), and other applications (or sets of instructions). For clarity one or more modules and/or applications may not be shown in FIG. 19.

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1944 and may also include various software components for handling data transmission via the network communications interface 1922. The external port 1944 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including without limitation text, still images, videos, animations, icons (such as user-interface objects including soft keys), and the like.

The graphics module in conjunction with a graphics processing unit (GPU) 1912 may process in real time or near real time, graphics data captured by optical sensor(s) 1934 and/or proximity sensors 1930.

A computer vision module, which may be a component of graphics module, provides analysis and recognition of graphics data. For example, while UAV 800 is in flight, the computer vision module along with graphics module (if separate), GPU 1912, and optical sensor(s) 1934 and/or proximity sensors 1930 may recognize and track the captured image of a subject located on the ground. The computer vision module may further communicate with a localization/navigation module and flight control module to update a relative position between UAV 800 and a point of reference, for example a target object (e.g., a PMD or human subject), and provide course corrections to maintain a constant relative position where the subject is in motion.

A localization/navigation module may determine the location and/or orientation of UAV 800 and provides this information for use in various modules and applications (e.g., to a flight control module in order to generate commands for use by the flight controller 1908).

An active image capture stabilization module may process motion information (e.g., from sensors 1926, 1928) to generate (e.g., using a using a multi-axis stabilization algorithm) control signals/commands configured to control gimbal motor(s) 1901. Similarly, active image capture stabilization module may process motion information (e.g., from sensors 1926, 1928) to digitally stabilized captured images (e.g., via an optical sensor device 1934) using an EIS process. An example stabilization process that optionally incorporates a feedback loop is described at a high level with respect to FIG. 14.

Optical sensor(s) 1934 in conjunction with, optical sensor controller 1932, and a graphics module, may be used to capture still images or video (including a video stream) and store them into memory 1916.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 1916 may store a subset of the modules and data structures identified above. Furthermore, memory 1916 may store additional modules and data structures not described above.

What is claimed is:

1. An aerial vehicle comprising:
a housing;
a front facing image capture assembly; and
an image stabilization assembly configured to isolate the image capture assembly from vibration of the housing using a member that counterbalances a mass of components of the image capture assembly,
wherein the member extends into an interior space of the housing.

2. The aerial vehicle of claim 1, wherein the member comprises a distal end and a proximal end, the distal end coupled to an interior surface of the housing and the proximal end coupled to the image capture assembly.

3. The aerial vehicle of claim 2, further comprising:
one or more passive vibration isolators,
wherein the distal end of the member is coupled to the interior surface of the housing via at least one of the one or more passive vibration isolators.

4. The aerial vehicle of claim 2, wherein:
at least one of the one or more passive vibration isolators comprises an elastic vibration isolator, or
at least one of the one or more passive vibration isolators has a 1:1:1 ratio of compression stiffness to tensile stiffness to shear stiffness.

5. The aerial vehicle of claim 2, further comprising:
a mounting assembly,
wherein the proximal end of the member is coupled to the image capture assembly via the mounting assembly.

6. The aerial vehicle of claim 1, wherein the housing has a front end and a back end, the image capture assembly is arranged proximate to the front end of the housing, and the member extends into an interior space of the housing from the image capture assembly towards the back end of the housing.

7. The aerial vehicle of claim 1, wherein the image stabilization assembly is configured to isolate the image capture assembly from vibration of the housing when the vibration is above a threshold frequency.

8. The aerial vehicle of claim 7, wherein the threshold frequency is 15 Hz.

9. The aerial vehicle of claim 1, wherein the image stabilization assembly comprises:
an active stabilization assembly including a motorized gimbal, the active stabilization assembly configured to actively counter motion by the aerial vehicle to actively stabilize the image stabilization assembly; and
a passive stabilization assembly including the member, the passive stabilization configured to passively counter the motion by the aerial vehicle to passively stabilize the image stabilization assembly.

10. The aerial vehicle of claim 1, wherein the member is made of one or more of plastic, metal, carbon fiber, synthetic fiber, or a composite material.

11. An image stabilization apparatus for isolating a front facing image capture assembly from vibration of a housing, the apparatus comprising:
one or more passive vibration isolators; and
a member that counterbalances a weight of the image capture assembly,
the member having a proximal end adapted to couple with the image capture assembly and a distal end coupled to the housing via one or more passive vibration isolators,
wherein the member extends into an interior space of the housing.

12. The image stabilization apparatus of claim 11, wherein at least one of the one or more passive vibration isolators comprises an elastic vibration isolator.

13. The image stabilization apparatus of claim of claim 11, wherein at least one of the one or more passive vibration isolators has a 1:1:1 ratio of compression stiffness to tensile stiffness to shear stiffness.

14. The image stabilization apparatus of claim of claim 11, further comprising:
a mounting assembly,
wherein the proximal end of the member is coupled to the image capture assembly via the mounting assembly.

15. The image stabilization apparatus of claim of claim 11, wherein the housing is coupled to an unmanned aerial vehicle (UAV).

16. The image stabilization apparatus of claim of claim 15, wherein the housing has a front end and a back end, the image capture assembly is arranged proximate to the front end of the housing, and the member extends into an interior space of the housing from the image capture assembly towards the back end of the housing.

17. The image stabilization apparatus of claim of claim 11, wherein the image stabilization assembly is configured to isolate the image capture assembly from vibration of the housing when the vibration is above a threshold frequency.

18. The image stabilization apparatus of claim of claim 11, wherein the image capture assembly includes an electronic imaging stabilization (EIS) system, the EIS system configured to:
   receive images captured by the image capture device; and
   process the received images to actively counter a detected motion.

19. A system for isolating an image capture assembly from vibration of a housing, the system comprising:
   one or more passive vibration isolators;
   an apparatus coupled to the housing via the one or more passive vibration isolators;
   a mounting assembly coupled to the apparatus and adapted to couple with the apparatus with the image capture assembly;
   wherein the apparatus is weighted to counterbalance a mass of the components of the image capture assembly,
   wherein the apparatus extends into an interior space of the housing.

20. The system of claim 19, wherein the housing is coupled to an unmanned aerial vehicle (UAV), wherein the image capture assembly includes an image capture device configured to capture images of a surrounding physical environment while UAV is in flight.

* * * * *